United States Patent [19]

Endo

[11] Patent Number: 5,189,557
[45] Date of Patent: Feb. 23, 1993

[54] HIGH VARIABLE MAGNIFICATION RANGE ZOOM LENS

[75] Inventor: Hiroshi Endo, Kanagawa, Japan

[73] Assignee: Canon Kabushiki Kaisha, Tokyo, Japan

[21] Appl. No.: 793,094

[22] Filed: Nov. 15, 1991

[30] Foreign Application Priority Data

Nov. 20, 1990 [JP] Japan .................................. 2-316248
Nov. 20, 1990 [JP] Japan .................................. 2-316249
Nov. 20, 1990 [JP] Japan .................................. 2-316261

[51] Int. Cl.$^5$ ............................................ G02B 15/14
[52] U.S. Cl. ..................................... 359/683; 359/684
[58] Field of Search ....................... 359/683, 685, 684

[56] References Cited

U.S. PATENT DOCUMENTS 4,269,484  5/1981  Laurent .............................. 359/683
4,896,950  1/1990  Endo et al. .......................... 359/683

FOREIGN PATENT DOCUMENTS 57-164710 10/1982 Japan .
60-39613   3/1985 Japan .
1-191819   8/1989 Japan .

Primary Examiner—Scott J. Sugarman
Attorney, Agent, or Firm—Fitzpatrick, Cella, Harper & Scinto

[57] ABSTRACT

A high variable magnification range zoom lens is disclosed, comprising, in the order from the object side, a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a negative refractive power, wherein letting the air separation between the i-th lens unit and the (i+1)st lens unit in the wide-angle end and the telephoto end be denoted by $D_{iW}$ and $D_{iT}$, respectively, zooming from the wide-angle end to the telephoto end is performed so as to satisfy the following conditions:

$D_{1W} < D_{1T}$ $D_{2W} > D_{2T}$ $D_{3W} < D_{3T}$ $D_{4W} > D_{4T}$

24 Claims, 21 Drawing Sheets

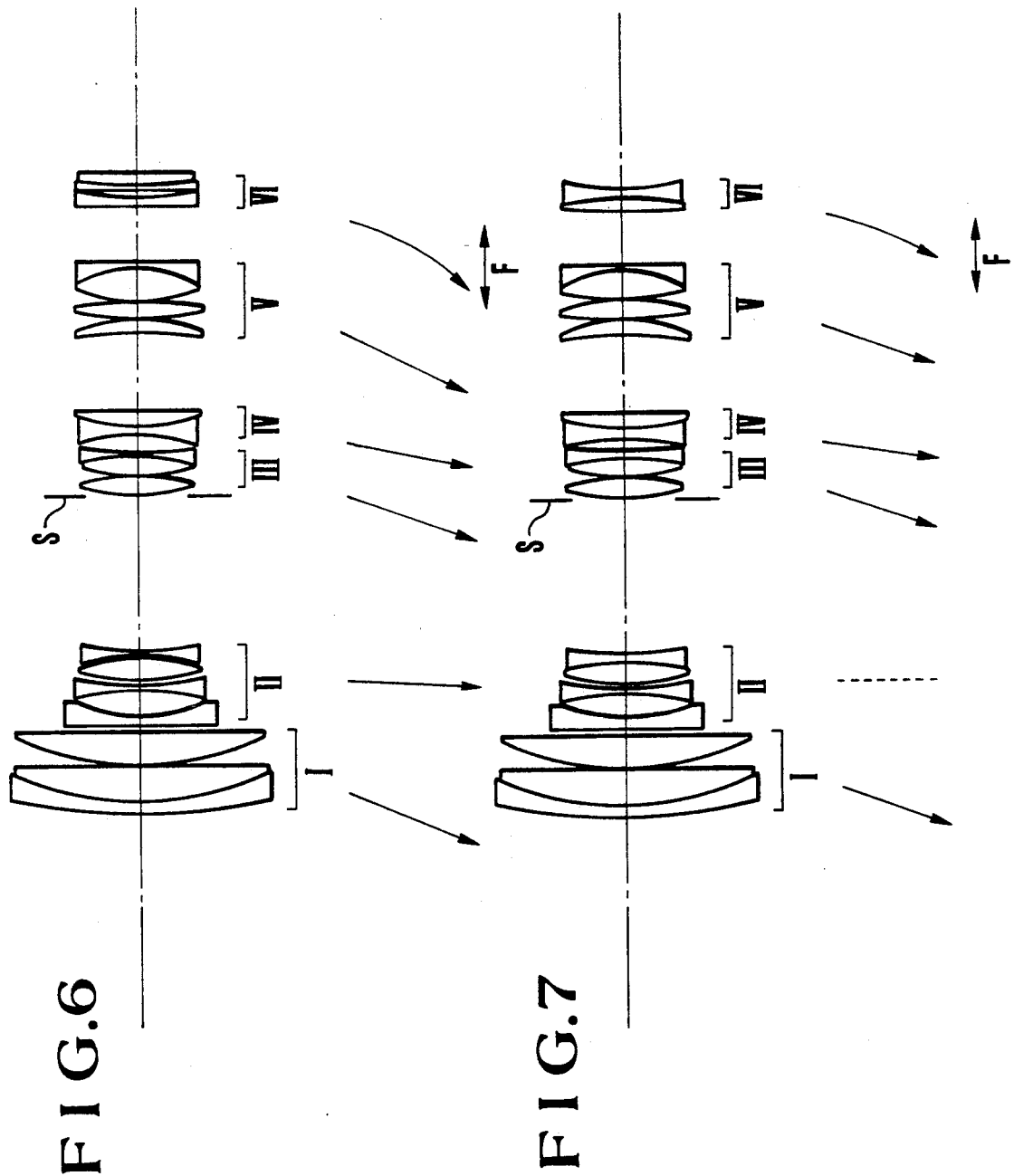

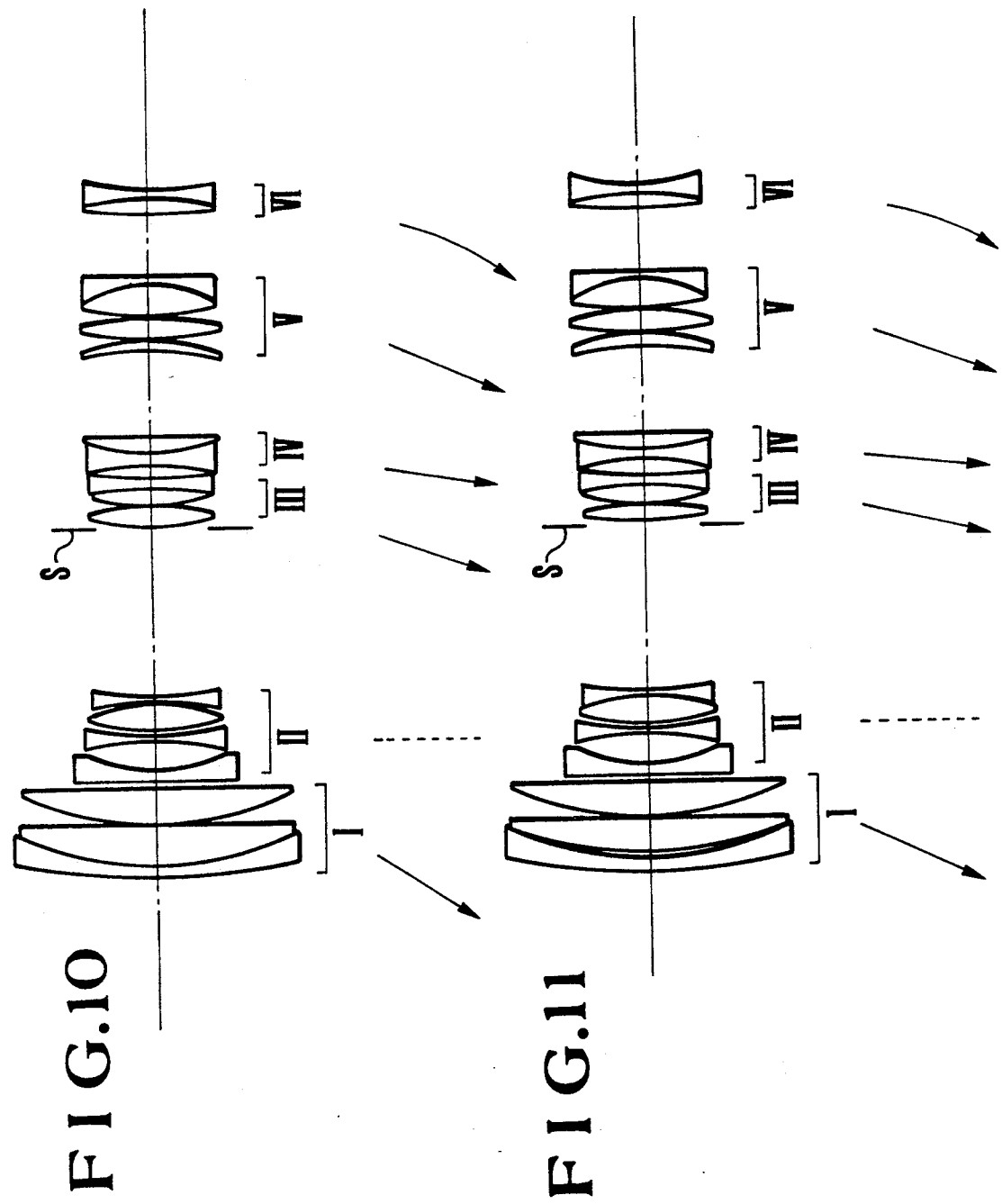

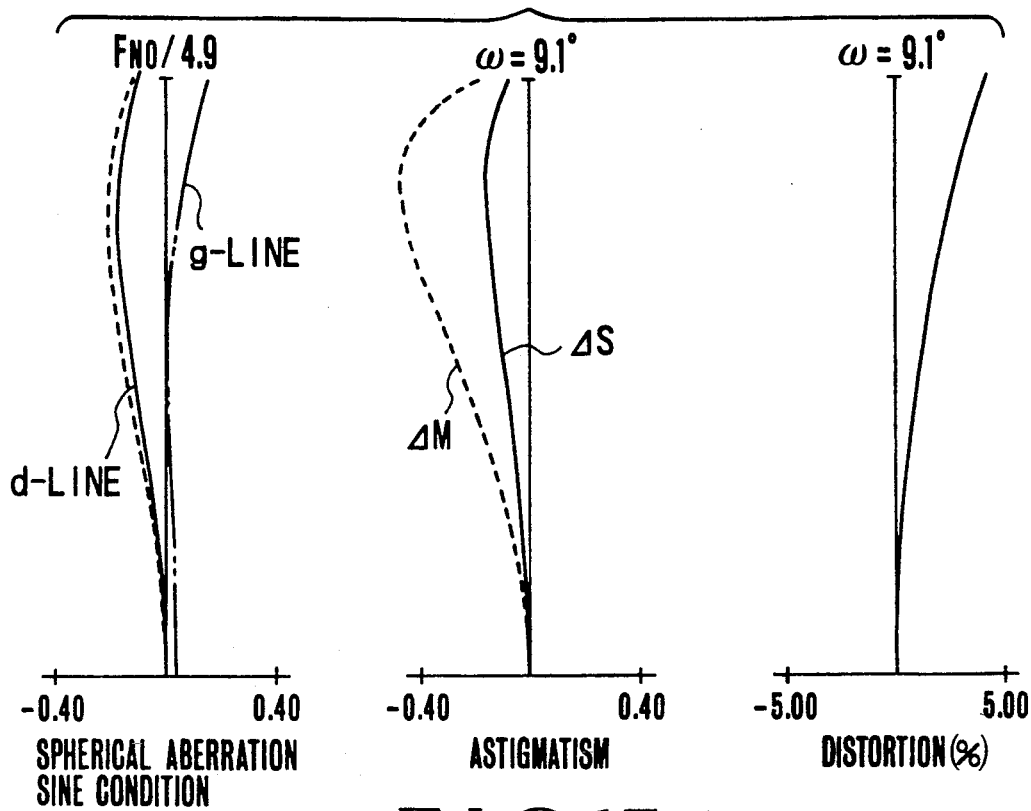
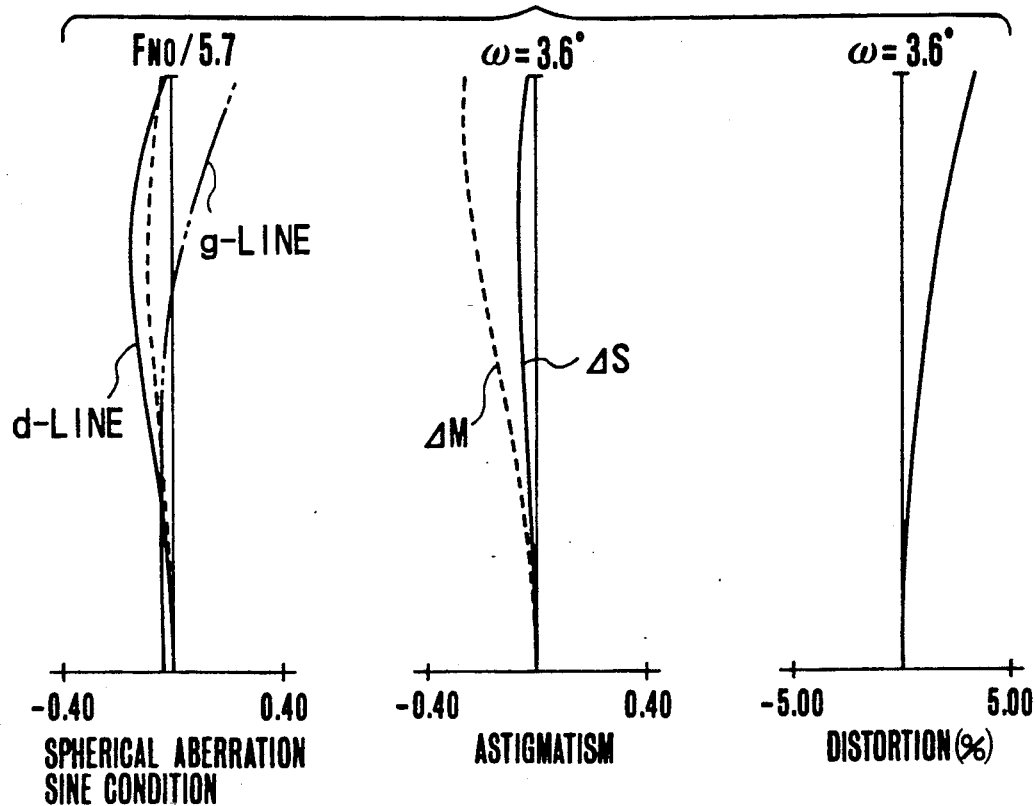

HIGH VARIABLE MAGNIFICATION RANGE ZOOM LENS

BACKGROUND OF THE INVENTION

1. Field of the Invention

This invention relates to zoom lenses suited to a single-lens reflex camera, video camera, etc. and, more particularly, to a zoom lens, while including the wide-angle region, having an extremely high variable magnification range of as much as 10.

2. Description of the Related Art

The zoom lenses including focal lengths of from the wide-angle to the telephoto region are known in, for example, Japanese Laid-Open Patent Applications No. Sho 57-164710 and No. Sho 60-39613. In these publications, zoom lenses composed of five units of plus, minus, plus, minus, plus, when counted from the object side, are obtained with a zoom ratio of 3 to 5.

Meanwhile, in Japanese Laid-Open Patent Application No. Hei 1-191819, likewise with the 5-unit form of plus, minus, plus, minus, plus, a zoom lens having a zoom ratio of about 10 is disclosed.

However, the above-described zoom lenses have their diameters of the front lens members (the first lens unit) and their total lengths of the optics (the distance from the first lens surface to the image plane) to get relatively large. Further, in particular, Japanese Laid-Open Patent Applications No. Sho 57-164710 and No. Sho 60-39613 are low in the zoom ratio, and could not be said to be sufficient, as, in recent years, a zoom lens having a higher zoom ratio is demanded. In Japanese Laid-Open Patent Application No. Hei 1-191819, a zoom lens of a remarkably high zoom ratio is disclosed, but the total length of the optics is long and the diameter of the front lens members, too, is considerably large.

SUMMARY OF THE INVENTION

With such problems in mind, an object of the present invention is to provide a zoom lens having a zoom ratio of about 10, while nevertheless having a total length of the optics shortened and a good optical performance.

To achieve the above-described object, a high variable magnification range zoom lens according to the invention comprises, in the order from the object side, a first lens unit having a positive refractive power, a second lens unit having a negative refractive power, a third lens unit having a positive refractive power, a fourth lens unit having a negative refractive power, a fifth lens unit having a positive refractive power and a sixth lens unit having a negative refractive power, wherein letting the air separation between the i-th lens unit and the (i+1)st lens unit in a wide-angle end and a telephoto end be denoted by $D_{iW}$ and $D_{iT}$, respectively, zooming from the wide-angle end to the telephoto end is performed under the following conditions:

$$D_{1W} < D_{1T}$$

$$D_{2W} > D_{2T}$$

$$D_{3W} < D_{3T}$$

$$D_{4W} > D_{4T}$$

BRIEF DESCRIPTION OF THE DRAWINGS

FIG. 6 is a lens block diagram of a numerical example 5 concerning the invention.

FIG. 7 is a lens block diagram of a numerical example 6 concerning the invention.

FIG. 10 is a lens block diagram of a numerical example 9 concerning the invention.

FIG. 11 is a lens block diagram of a numerical example 10 concerning the invention.

FIGS. 15(A), 15(B) and 15(C) are graphs of the various aberrations of the numerical example 4 concerning the invention.

Incidentally, in the graphs of the aberrations, the graphs of the figure numbers with the suffixes (A), (B) and (C) are the graphs of the various aberrations of the wide-angle end, an intermediate focal length and the telephoto end, respectively, S stands for the sagittal image surface, M for the meridional image surface, d for the d-line and g for the g line.

DETAILED DESCRIPTION OF THE PREFERRED EMBODIMENTS

Figure 1:
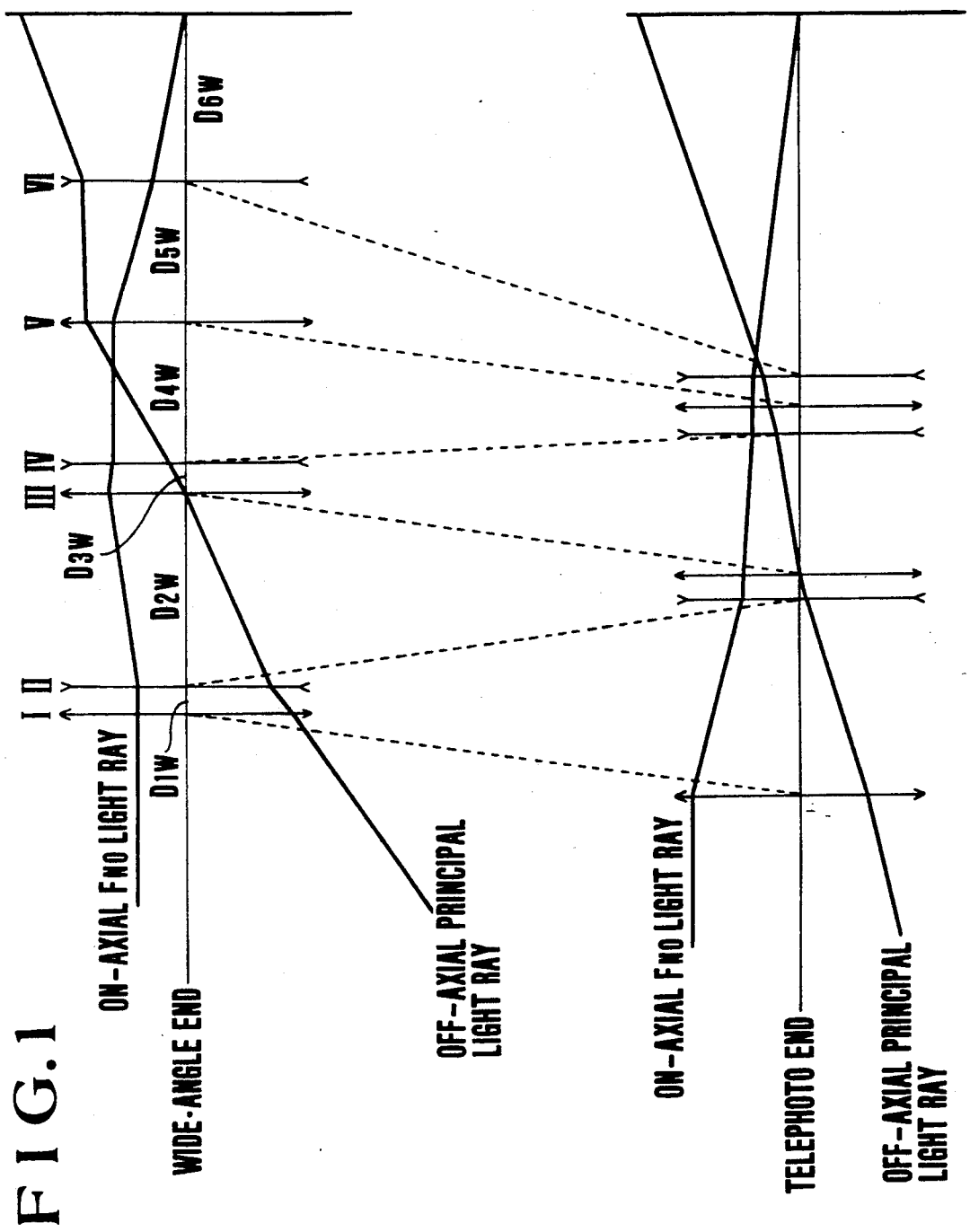
FIG. 1 is a diagram showing the paraxial arrangement concerning the present invention.
Figure 2:
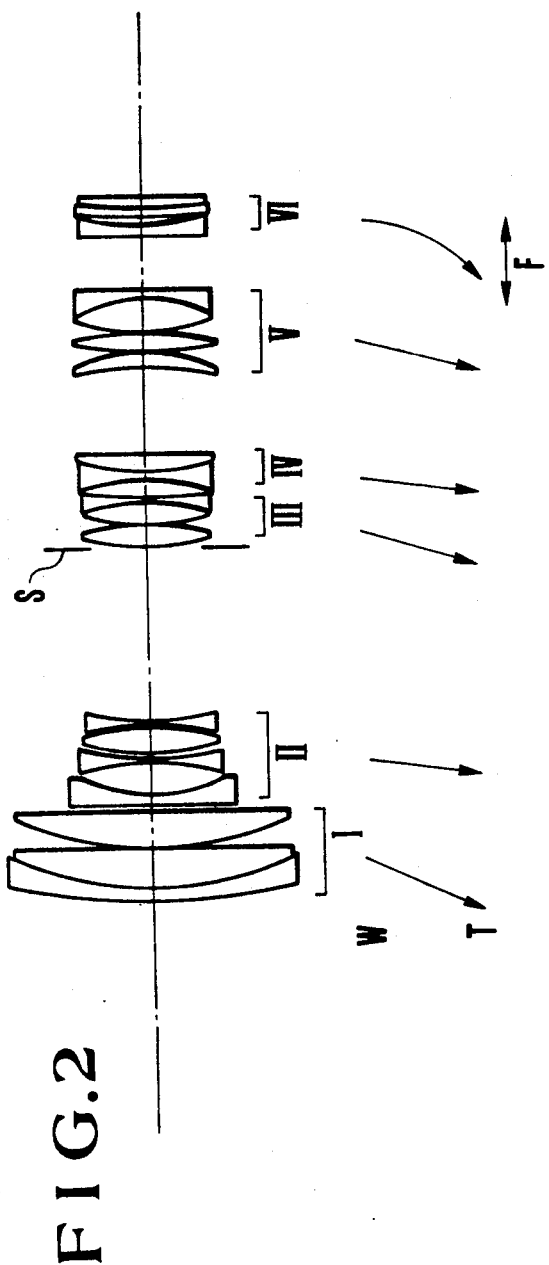
FIG. 2 is a lens block diagram of a numerical example 1 concerning the invention.
Figure 3:
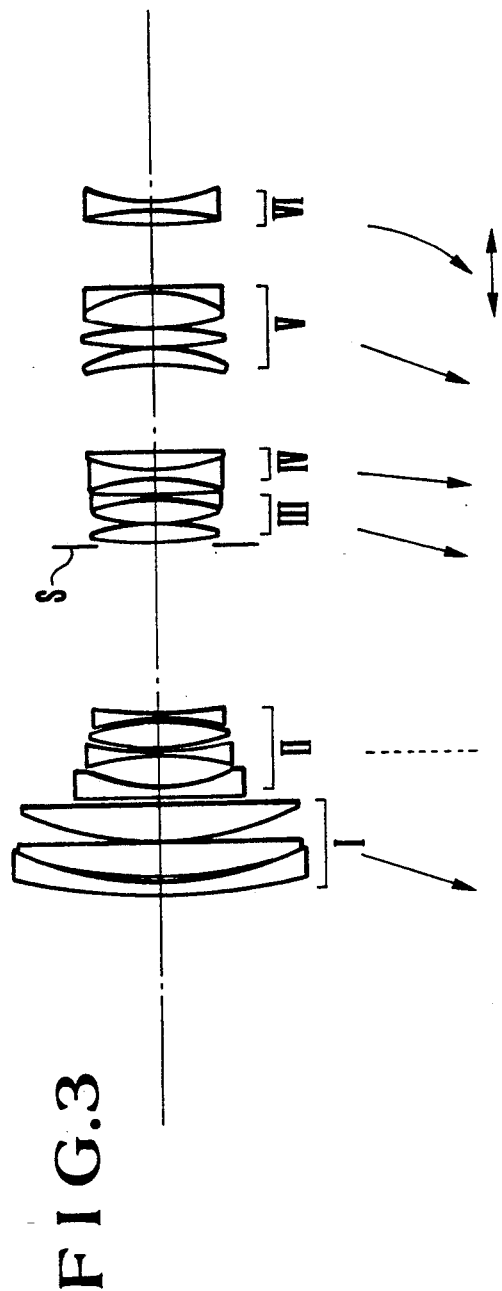
FIG. 3 is a lens block diagram of a numerical example 2 concerning the invention.
Figure 4:
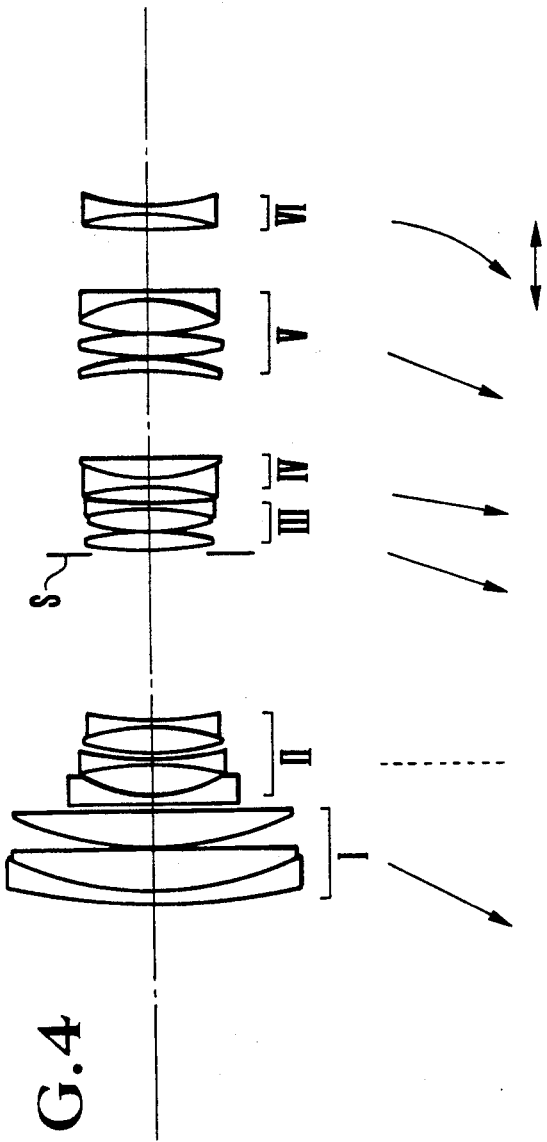
FIG. 4 is a lens block diagram of a numerical example 3 concerning the invention.
Figure 5:
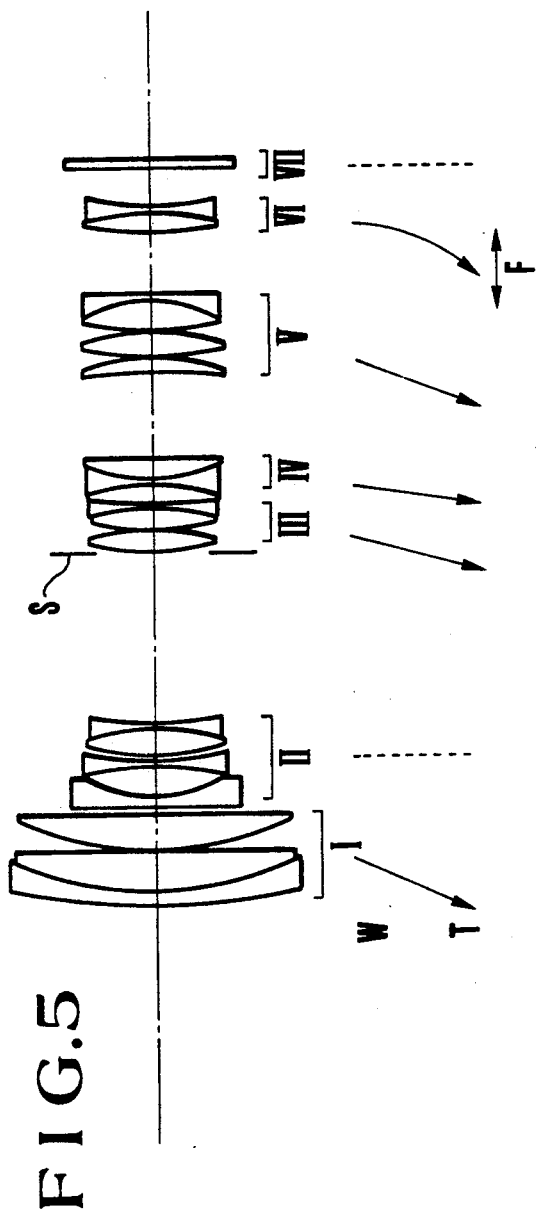
FIG. 5 is a lens block diagram of a numerical example 4 concerning the invention.
Figures 8, 9:
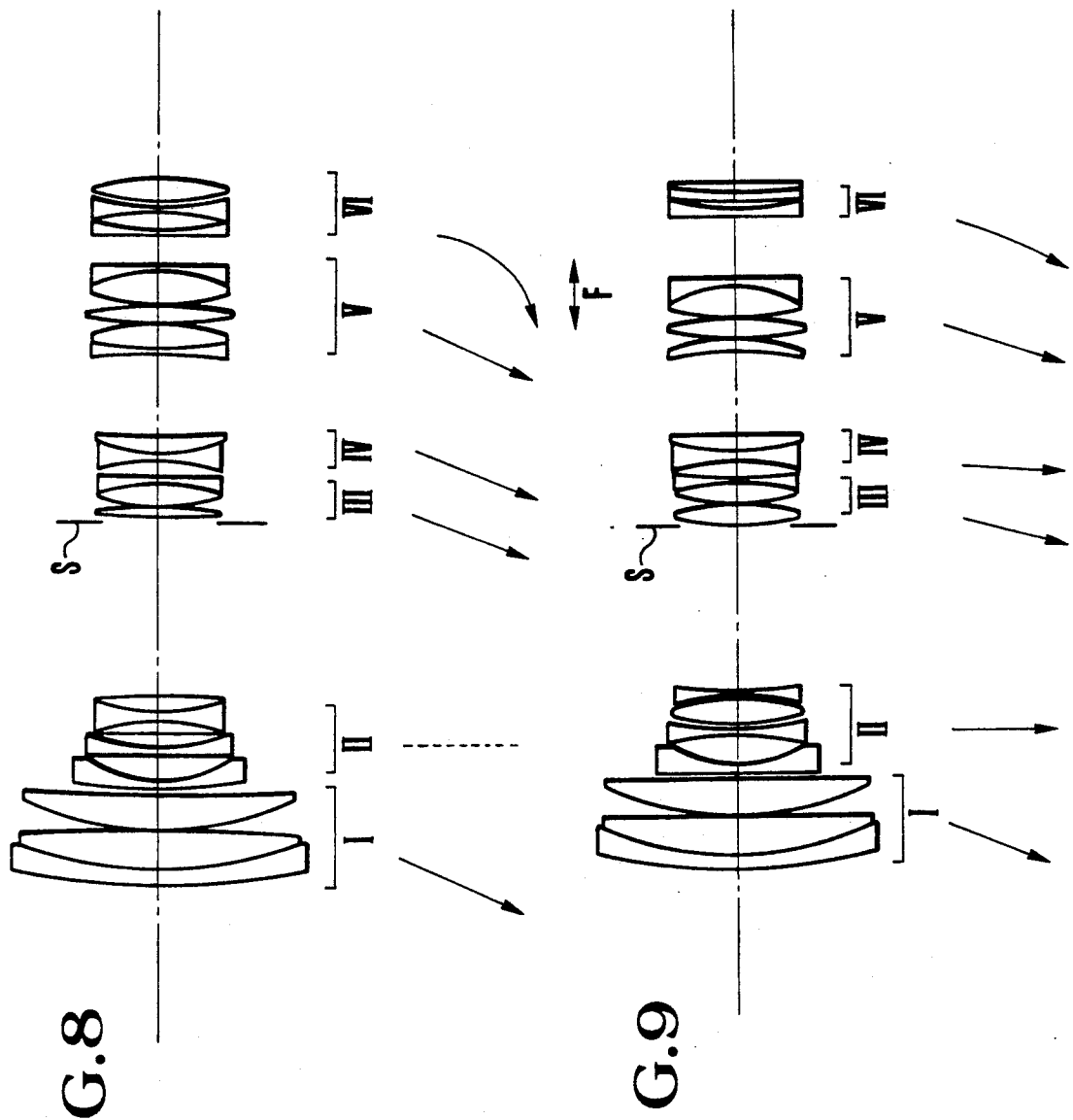
FIG. 8 is a lens block diagram of a numerical example 7 concerning the invention.
FIG. 9 is a lens block diagram of a numerical example 8 concerning the invention.
Figure 12A:
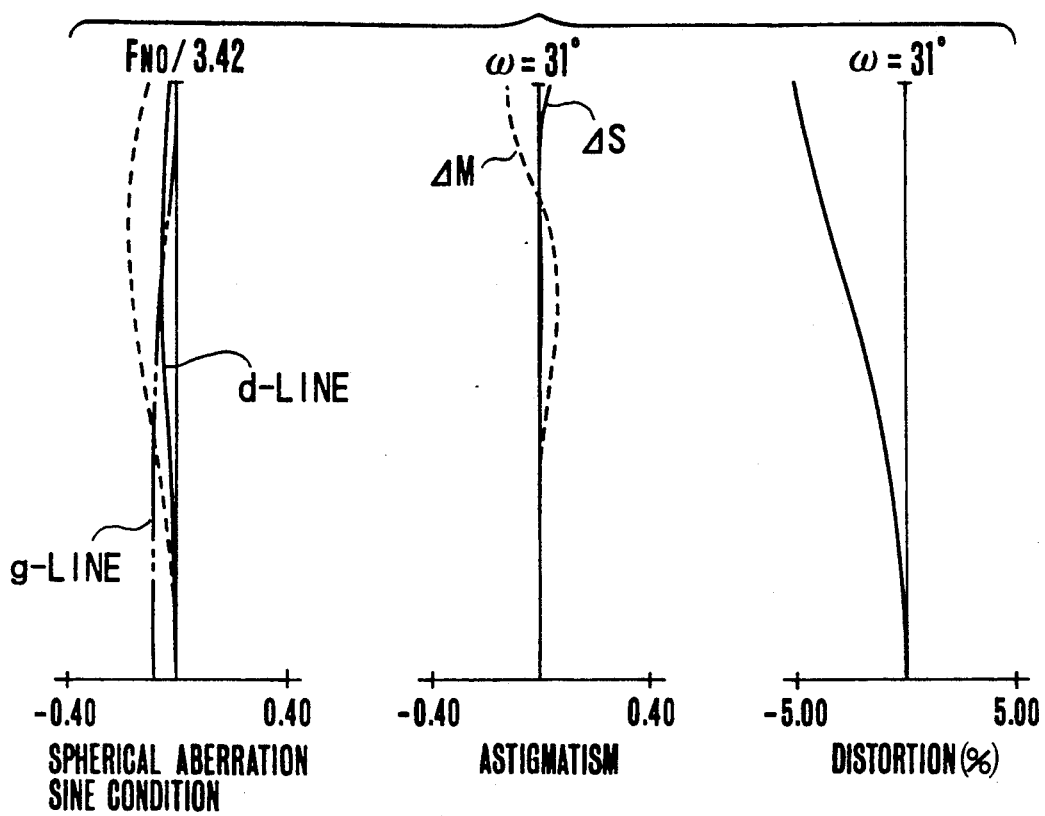
FIGS. 12(A), 12(B) and 12(C) are graphs of the various aberrations of the numerical example 1 concerning the invention.
Figure 12B:
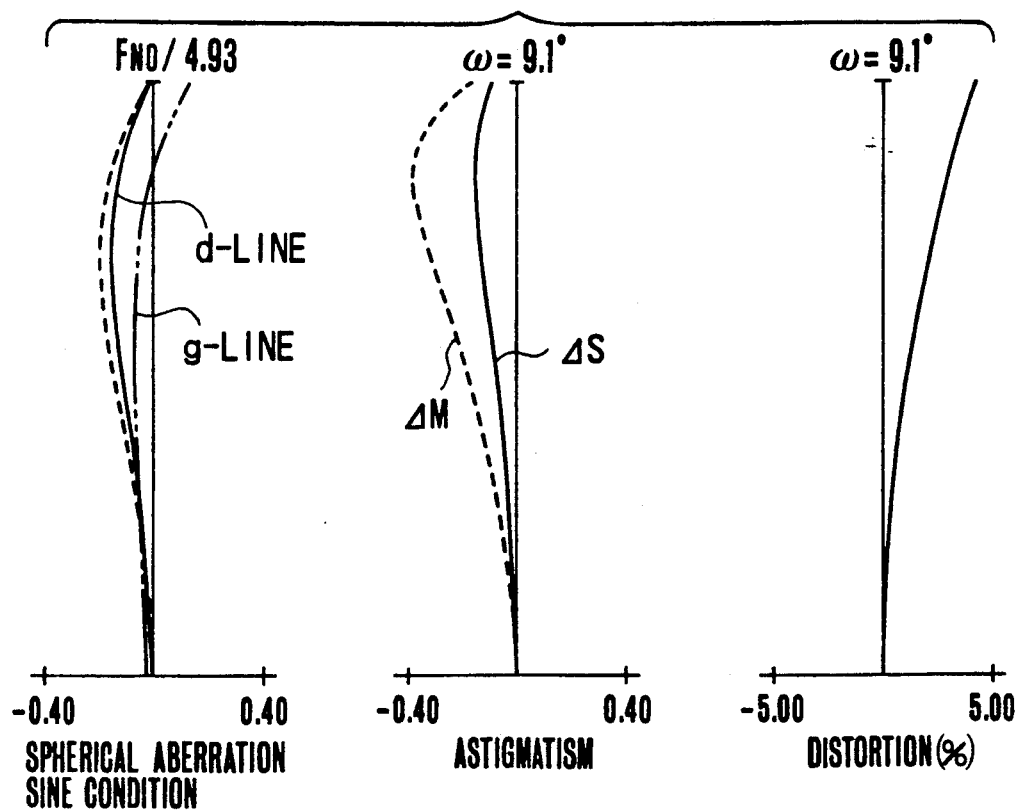
Figure 12C:
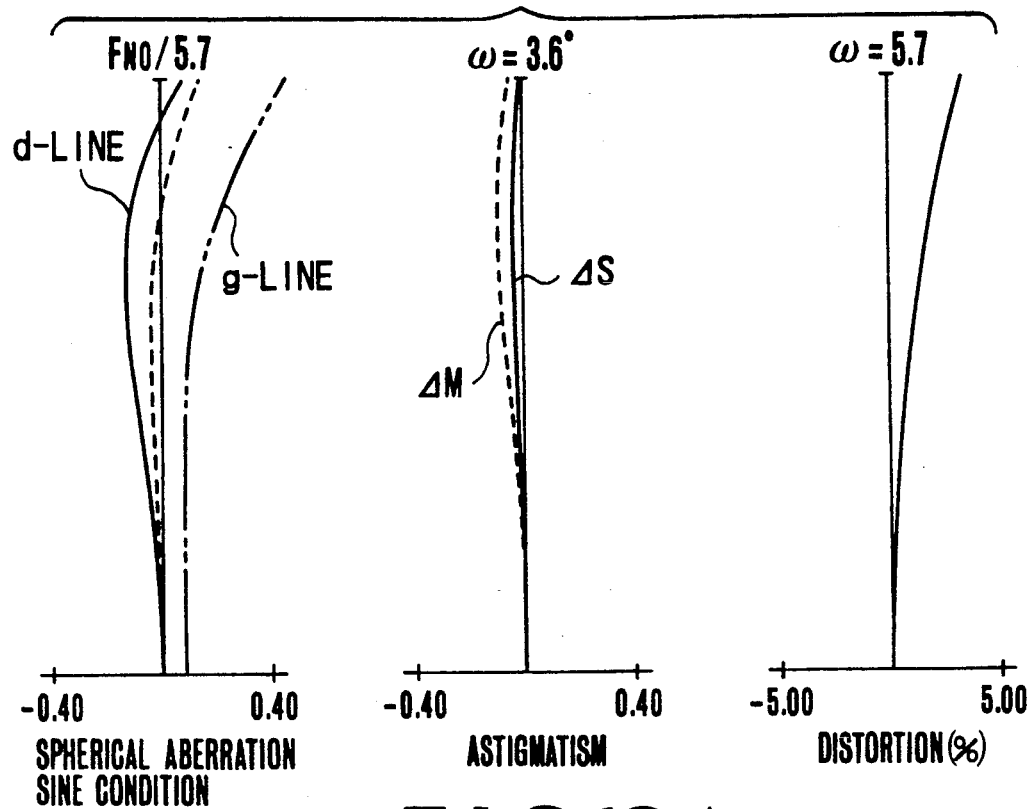
Figure 13A:
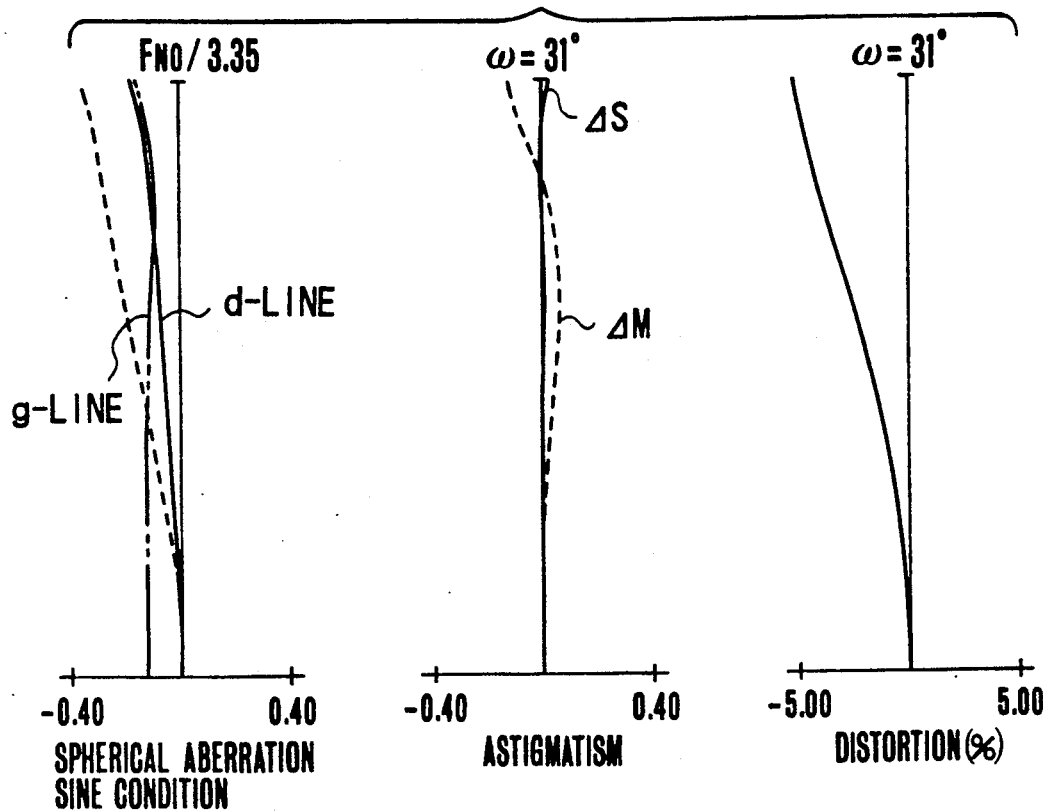
FIGS. 13(A), 13(B) and 13(C) are graphs of the various aberrations of the numerical example 2 concerning the invention.
Figure 13B:
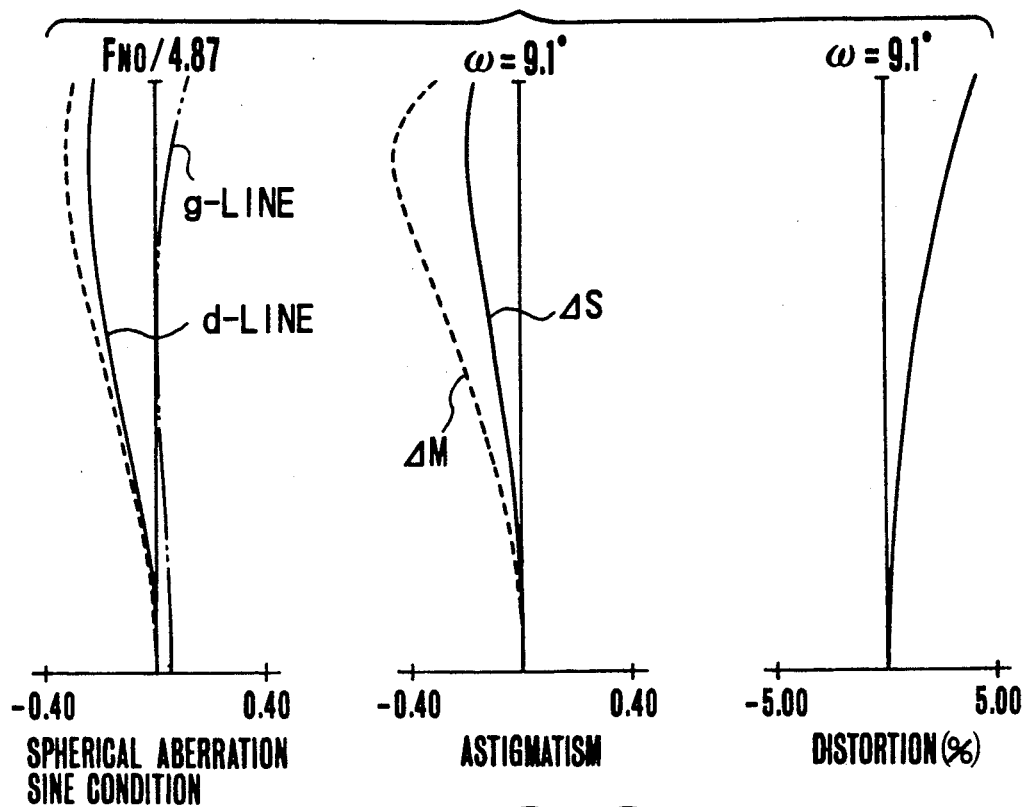
Figure 13C:
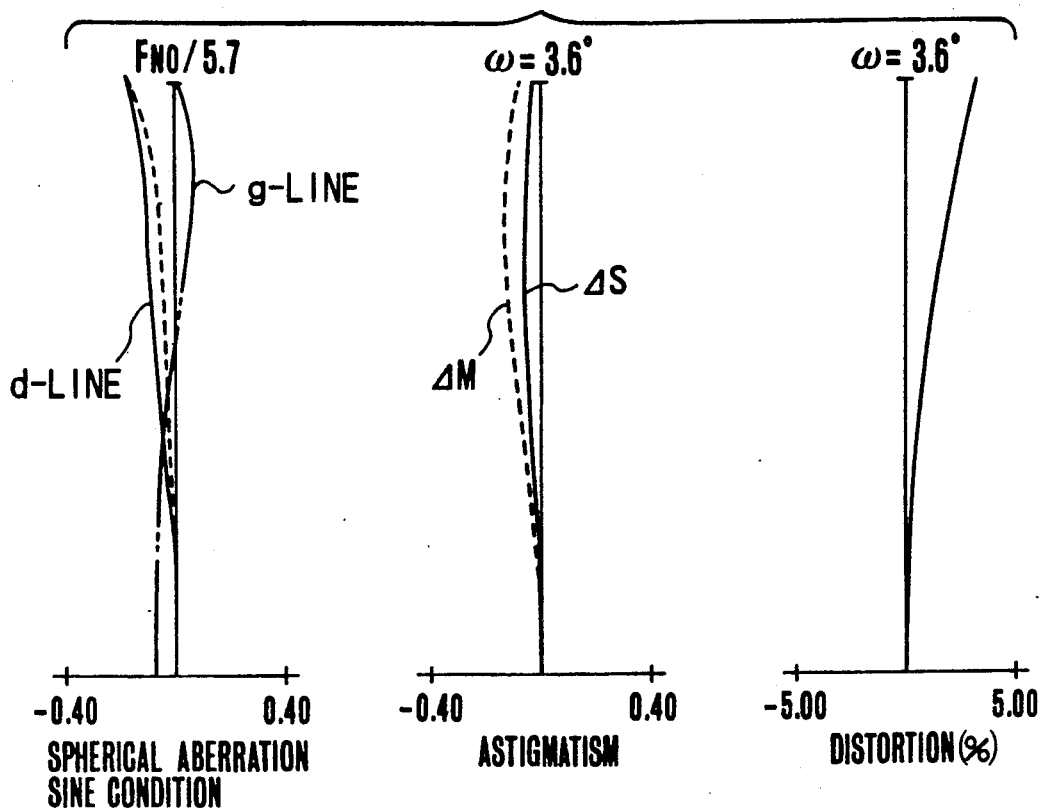
Figure 14:
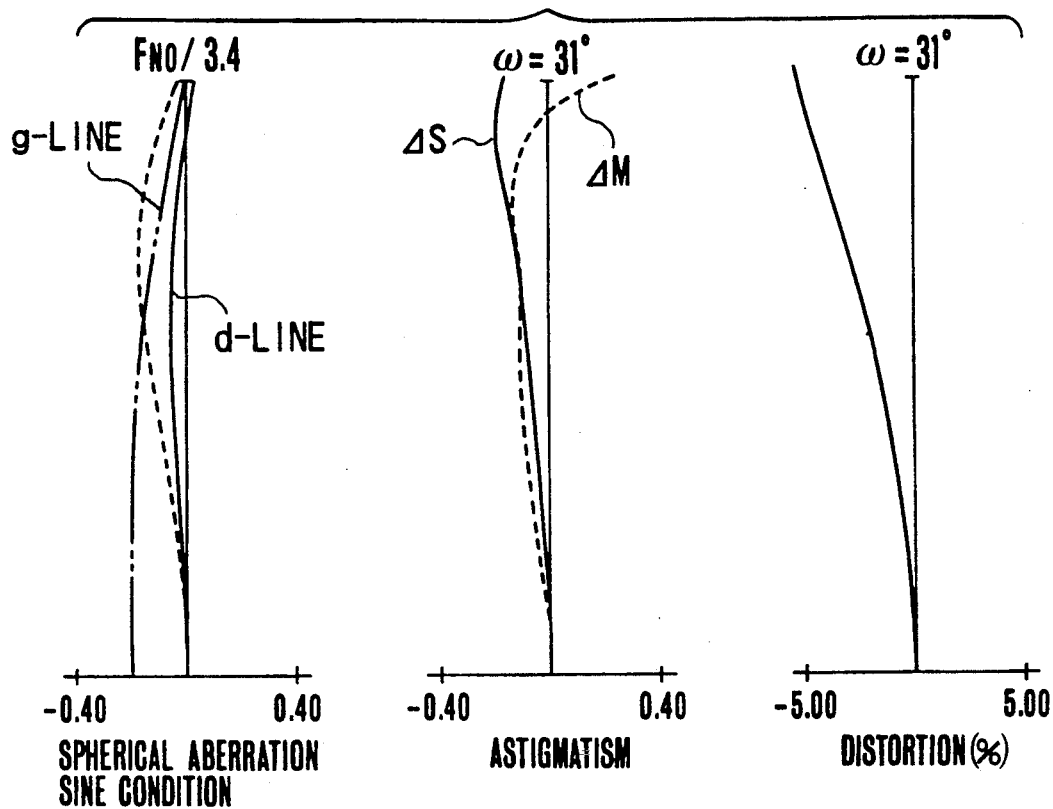
FIGS. 14(A), 14(B) and 14(C) are graphs of the various aberrations of the numerical example 3 concerning the invention.
Figure 14:
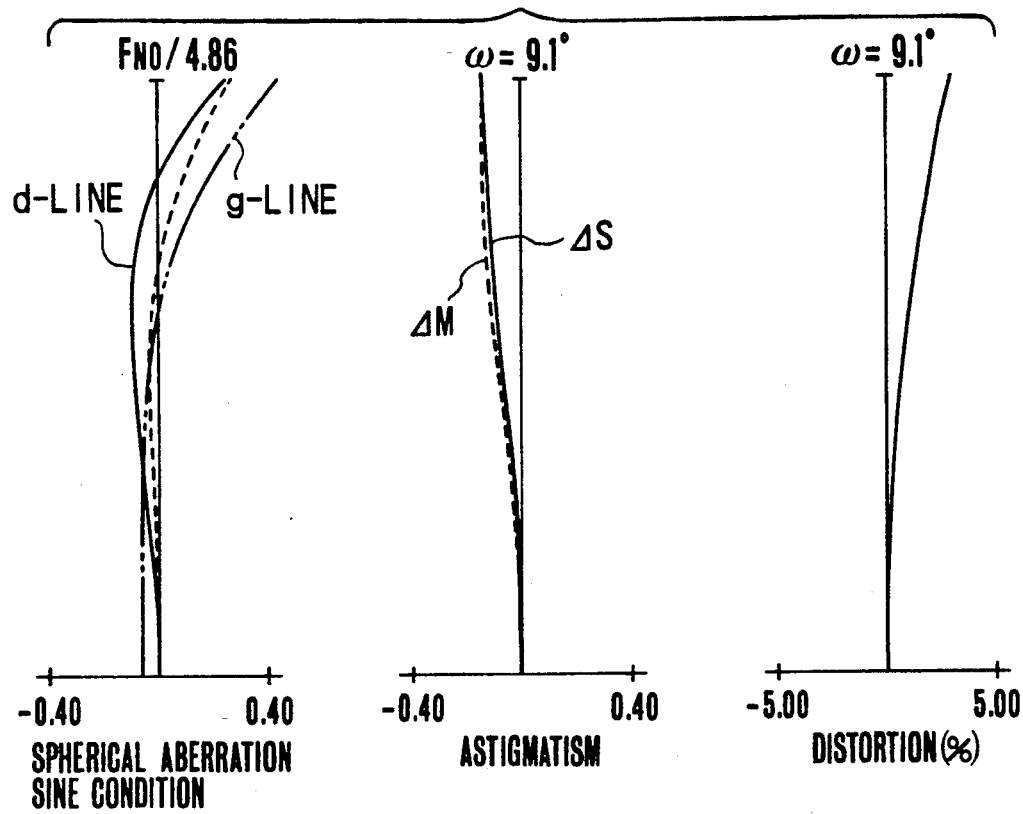
Figure 14C:
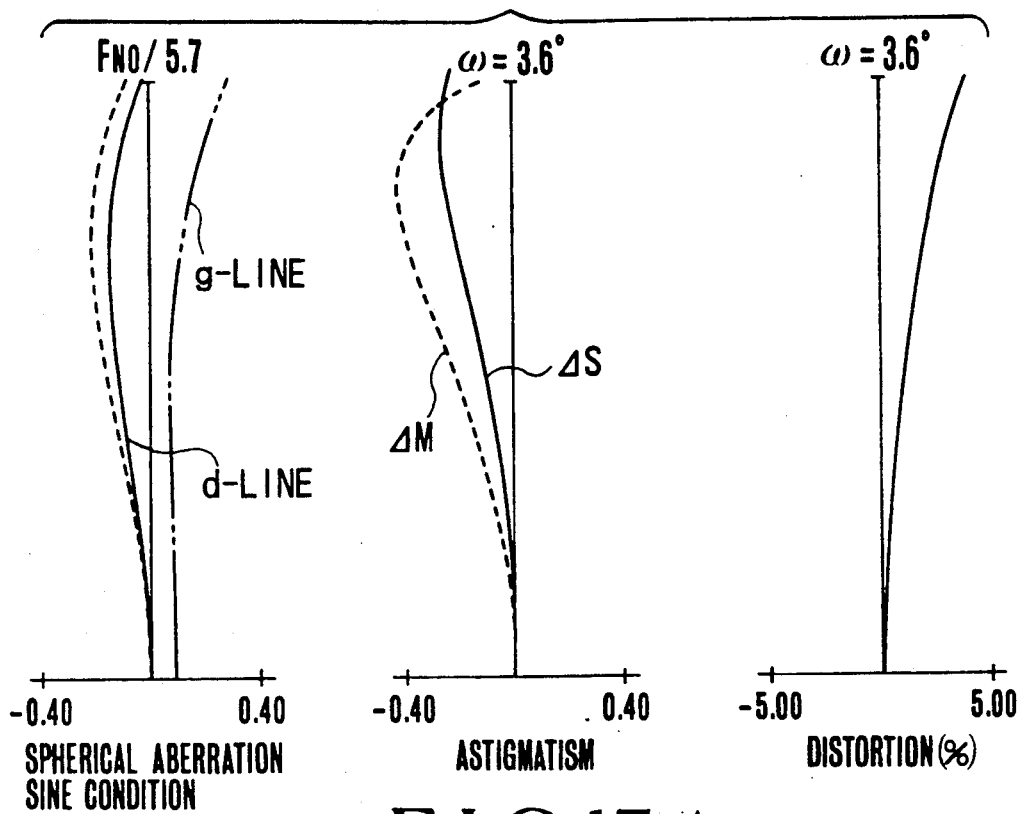
Figure 15A:
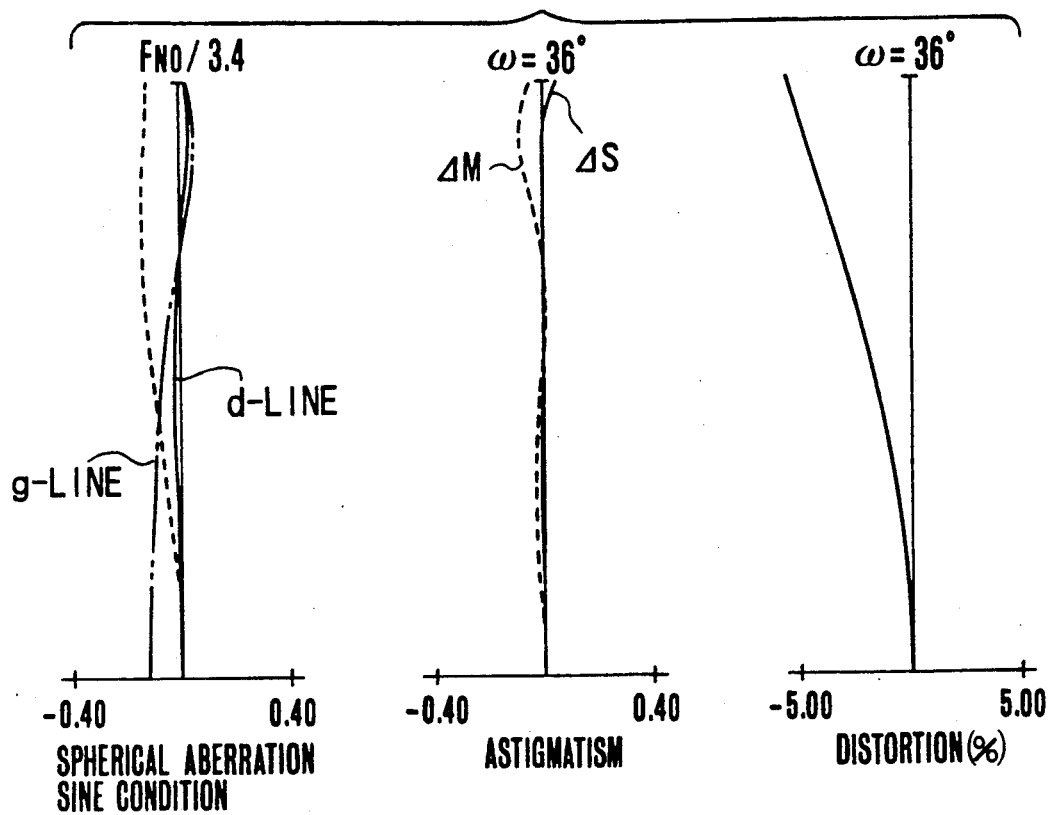
Figure 16A:
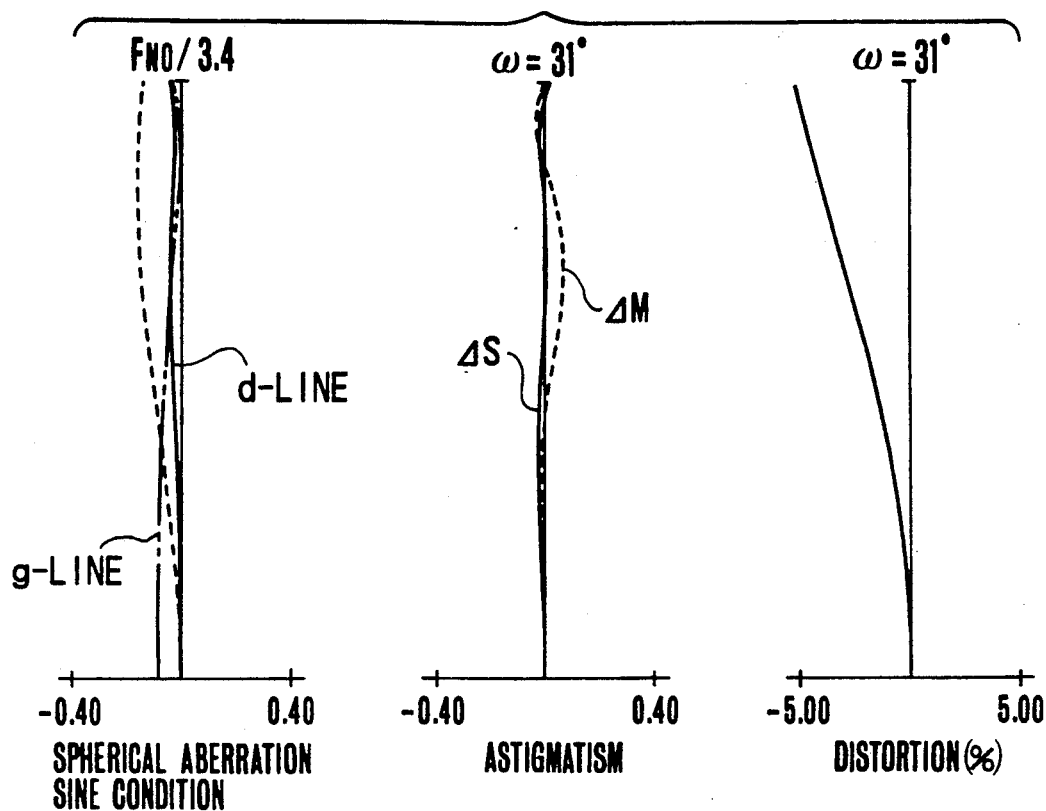
FIGS. 16(A), 16(B) and 16(C) are graphs of the various aberrations of the numerical example 5 concerning the invention.
Figure 16B:
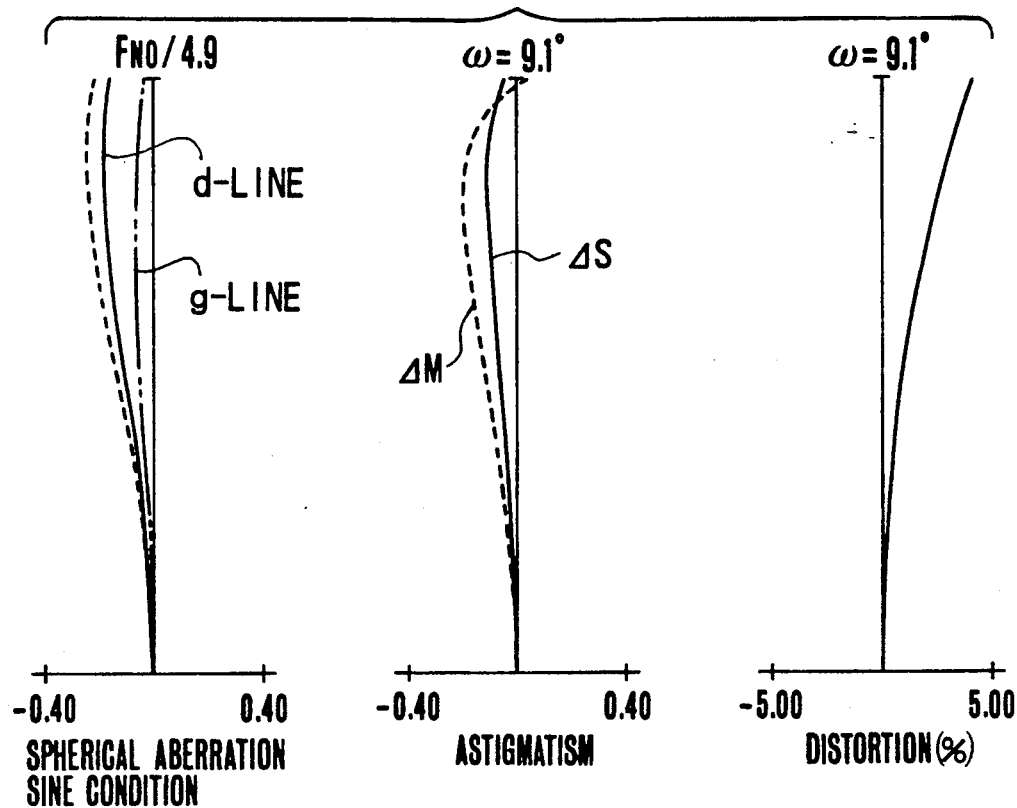
Figure 16C:
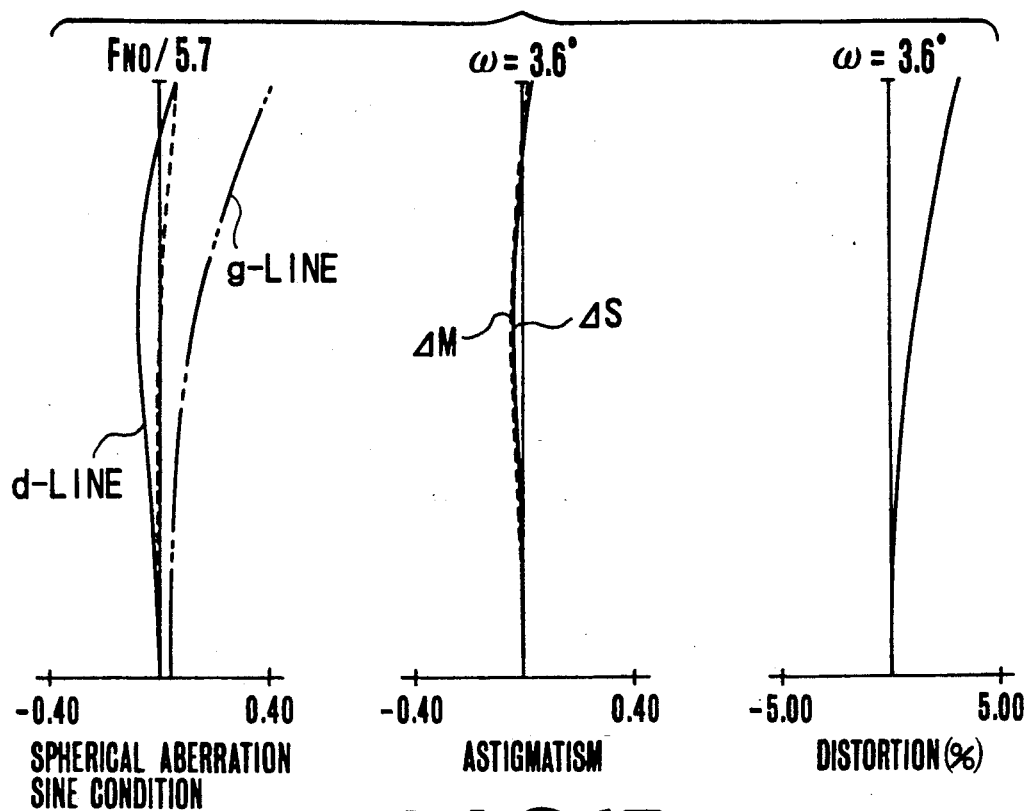
Figure 17A:
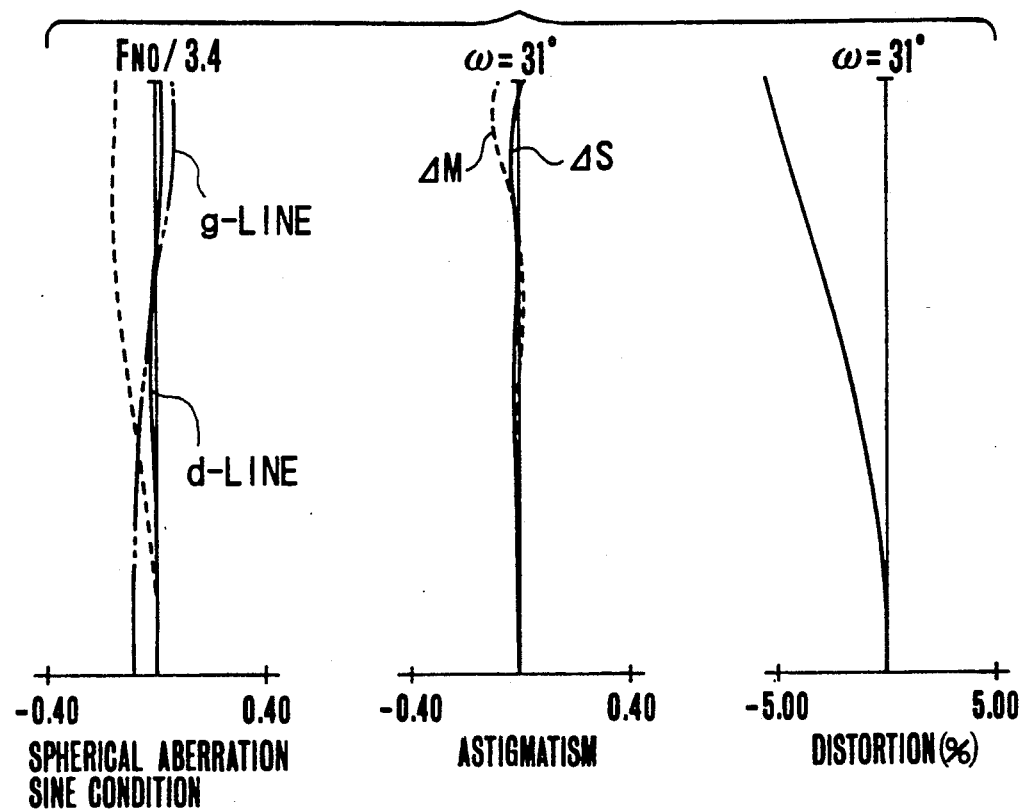
FIGS. 17(A), 17(B) and 17(C) are graphs of the various aberrations of the numerical example 6 concerning the invention.
Figure 17B:
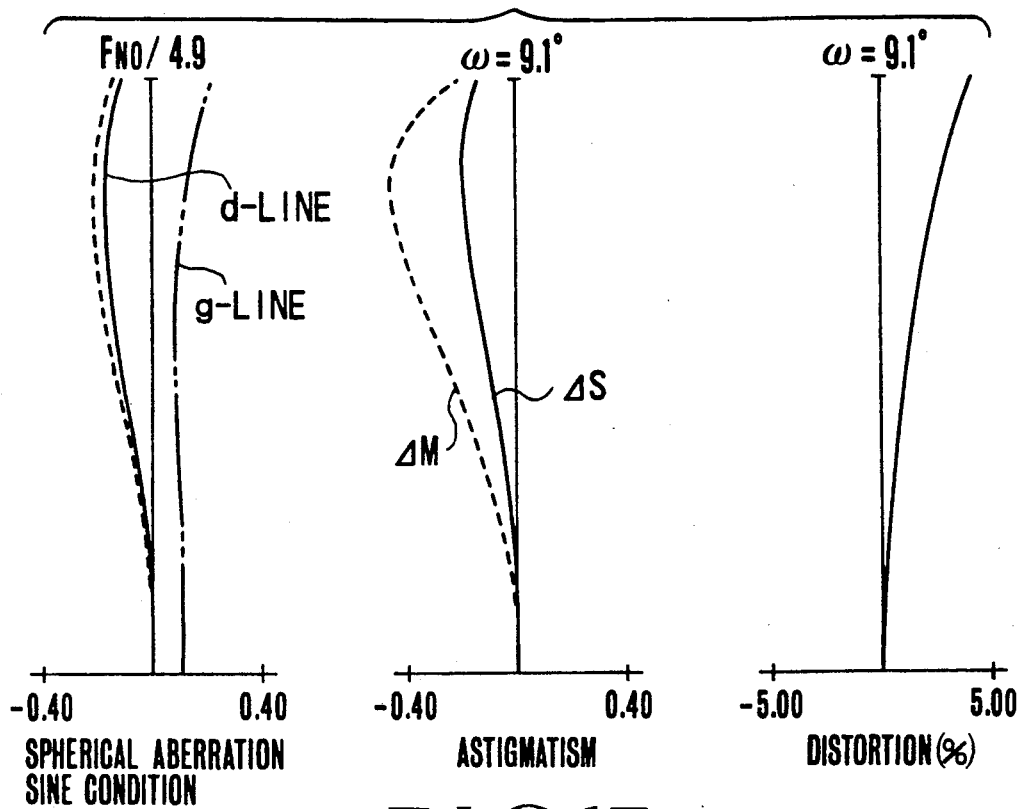
Figure 17C:
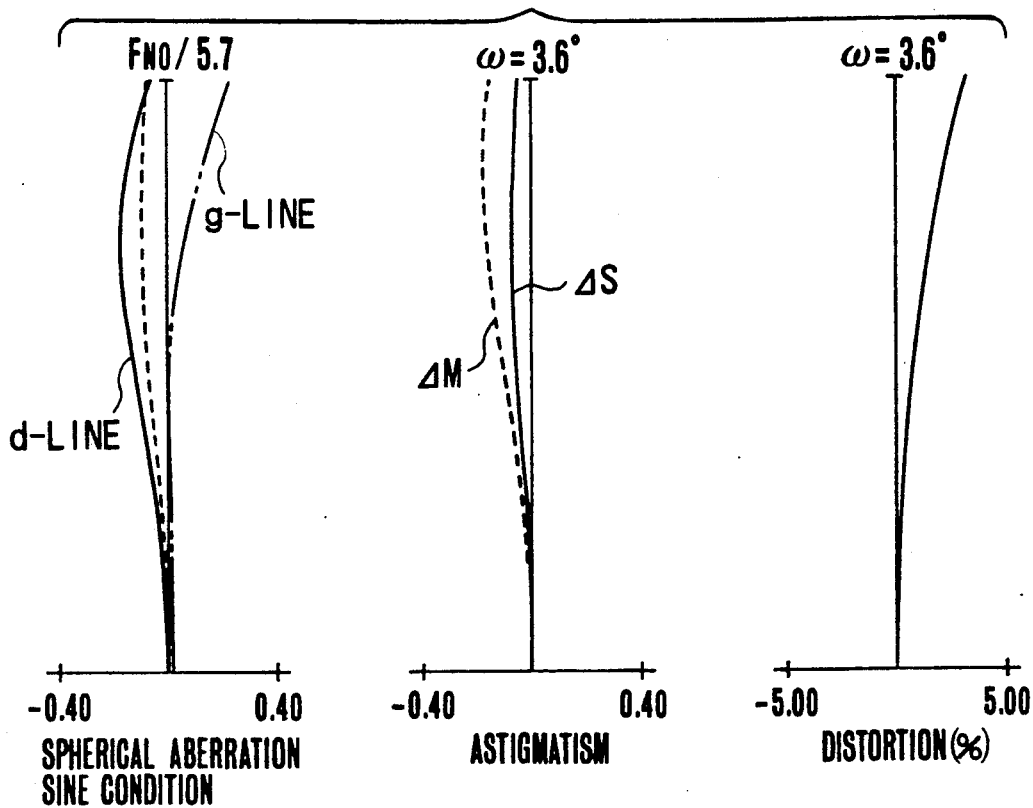
Figure 18A:
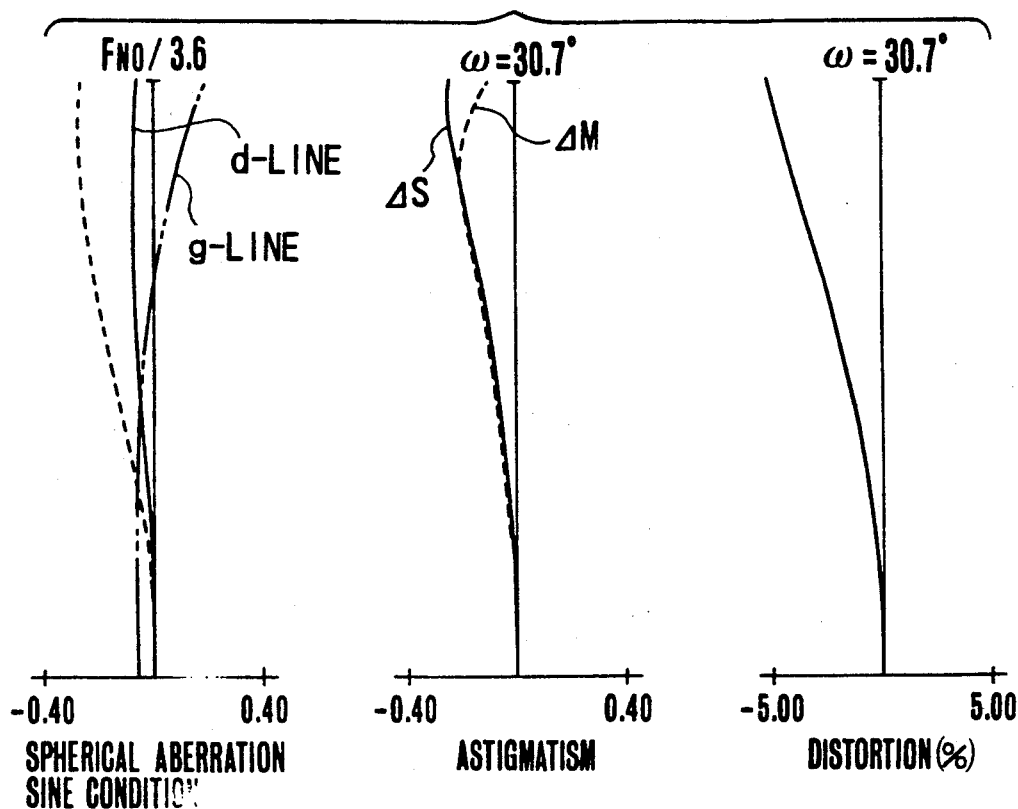
FIGS. 18(A), 18(B) and 18(C) are graphs of the various aberrations of the numerical example 7 concerning the invention.
Figure 18B:
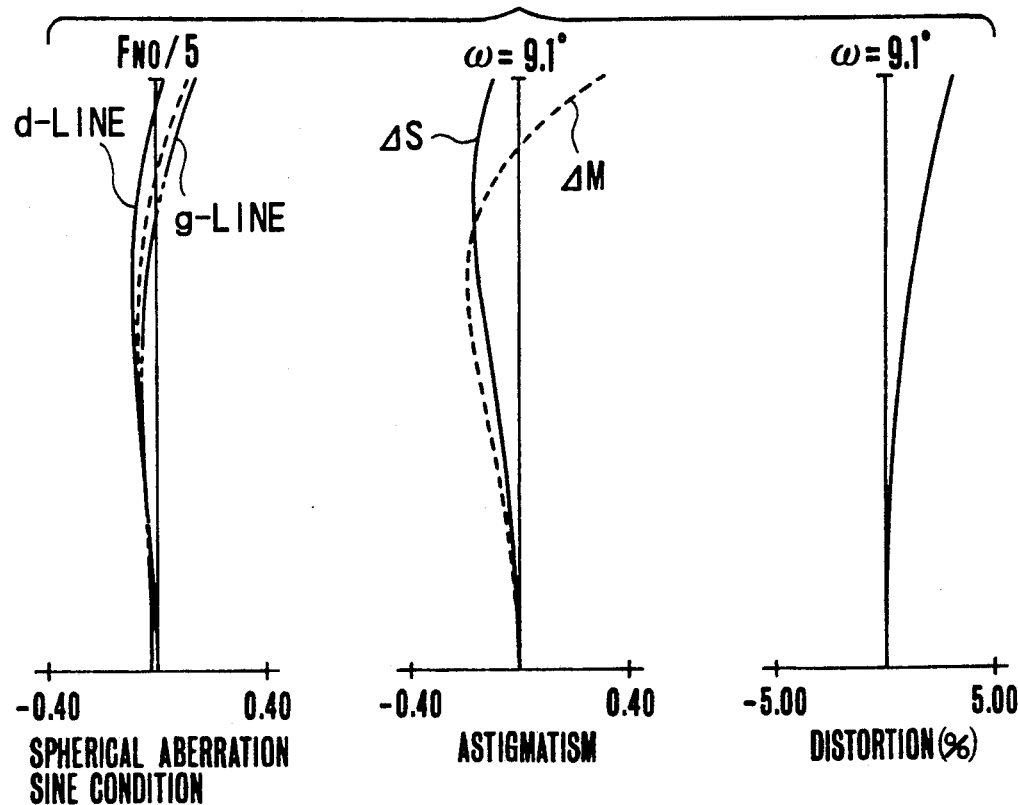
Figure 18C:
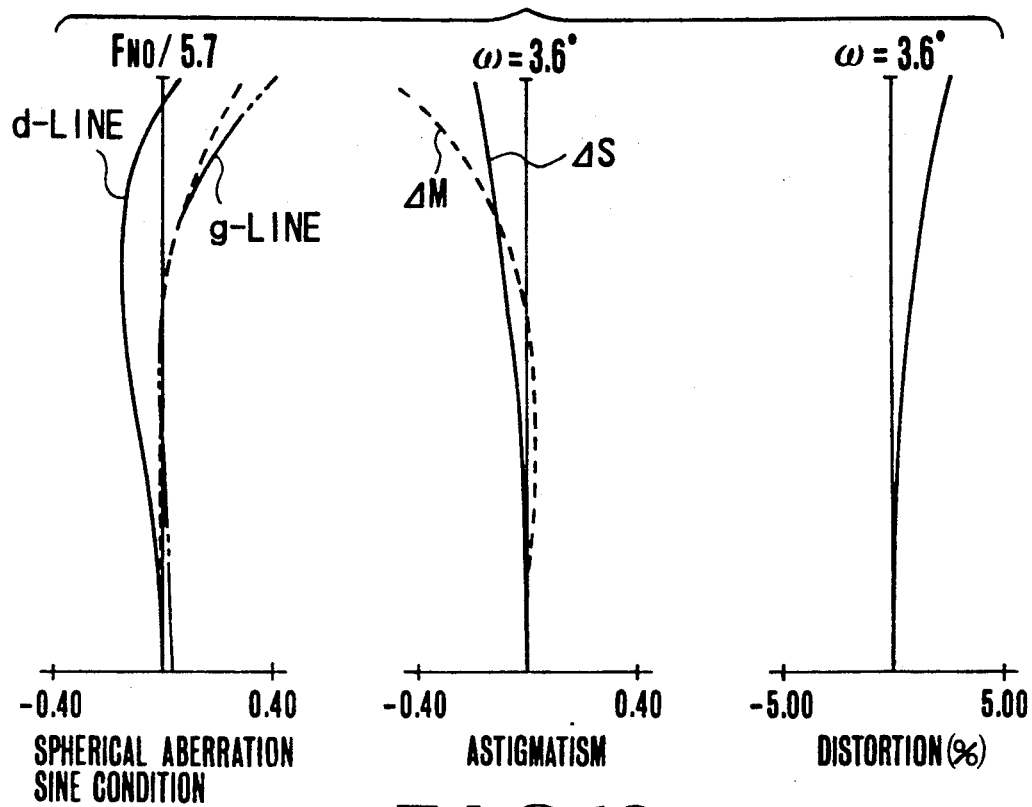
Figure 19A:
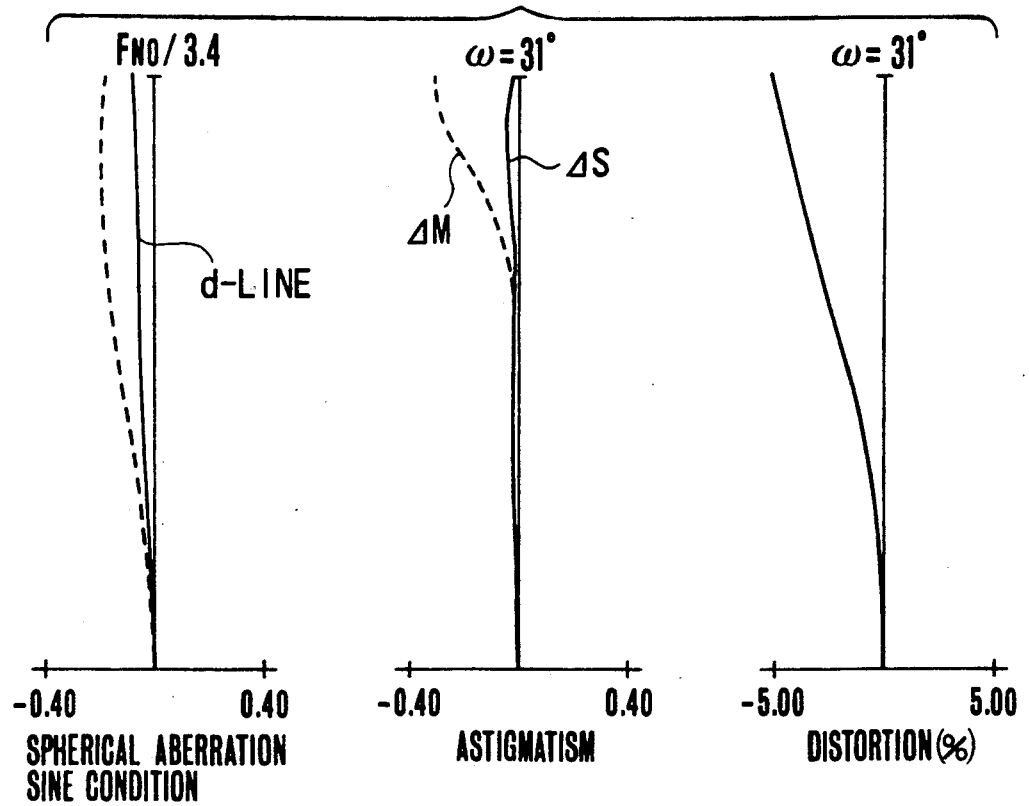
FIGS. 19(A), 19(B) and 19(C) are graphs of the various aberrations of the numerical example 8 concerning the invention.
Figure 19B:
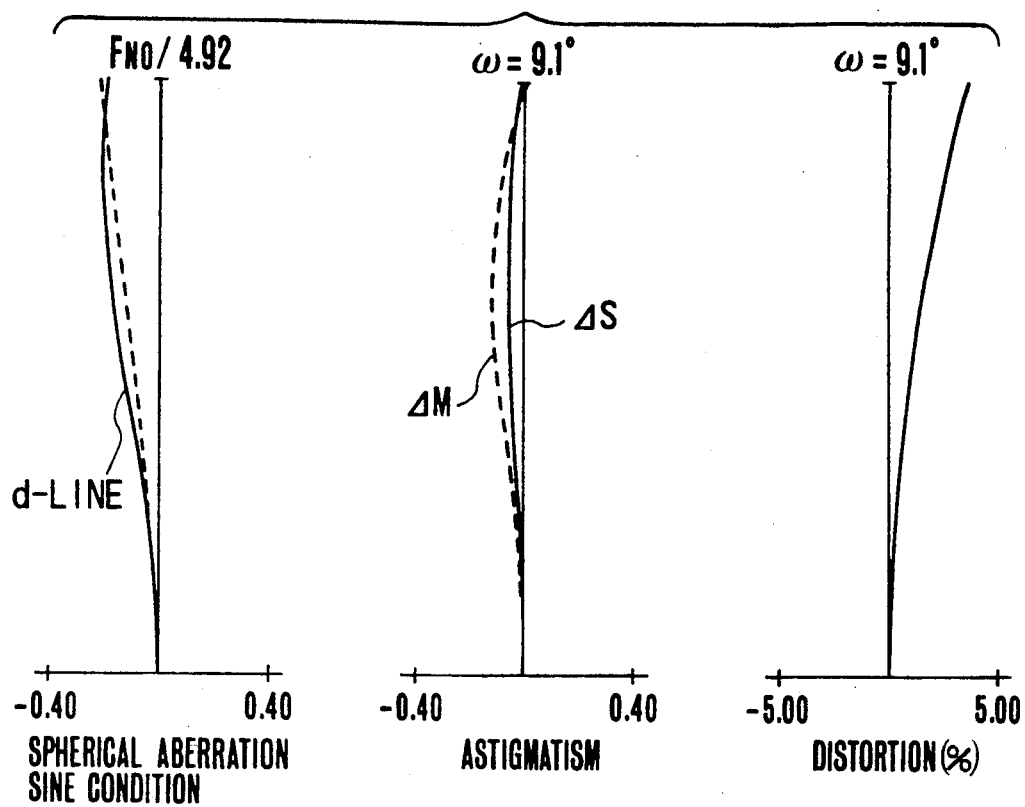
Figure 19C:
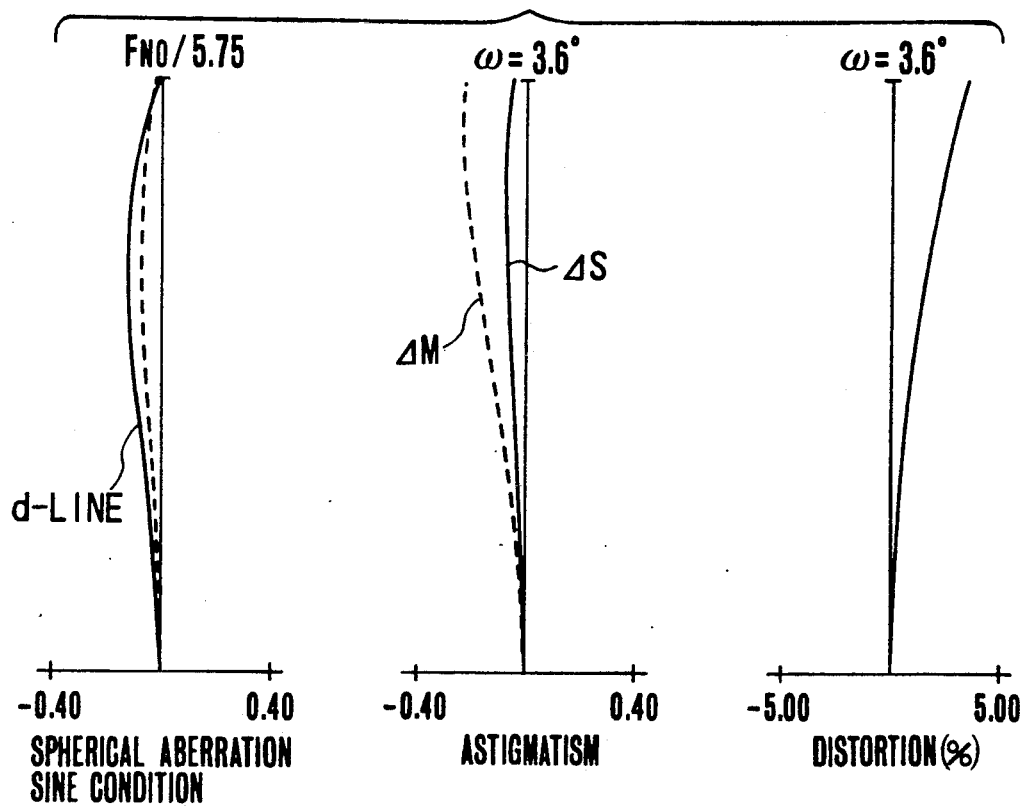
Figure 20A:
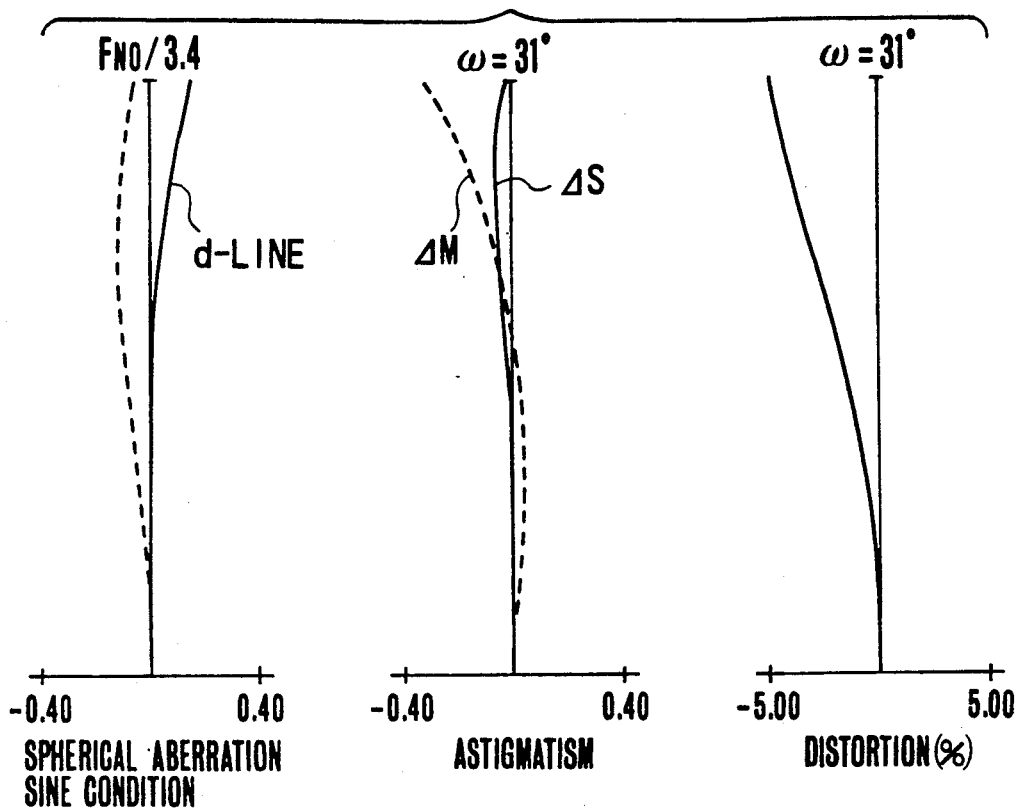
FIGS. 20(A), 20(B) and 20(C) are graphs of the various aberrations of the numerical example 9 of concerning the invention.
Figure 20B:
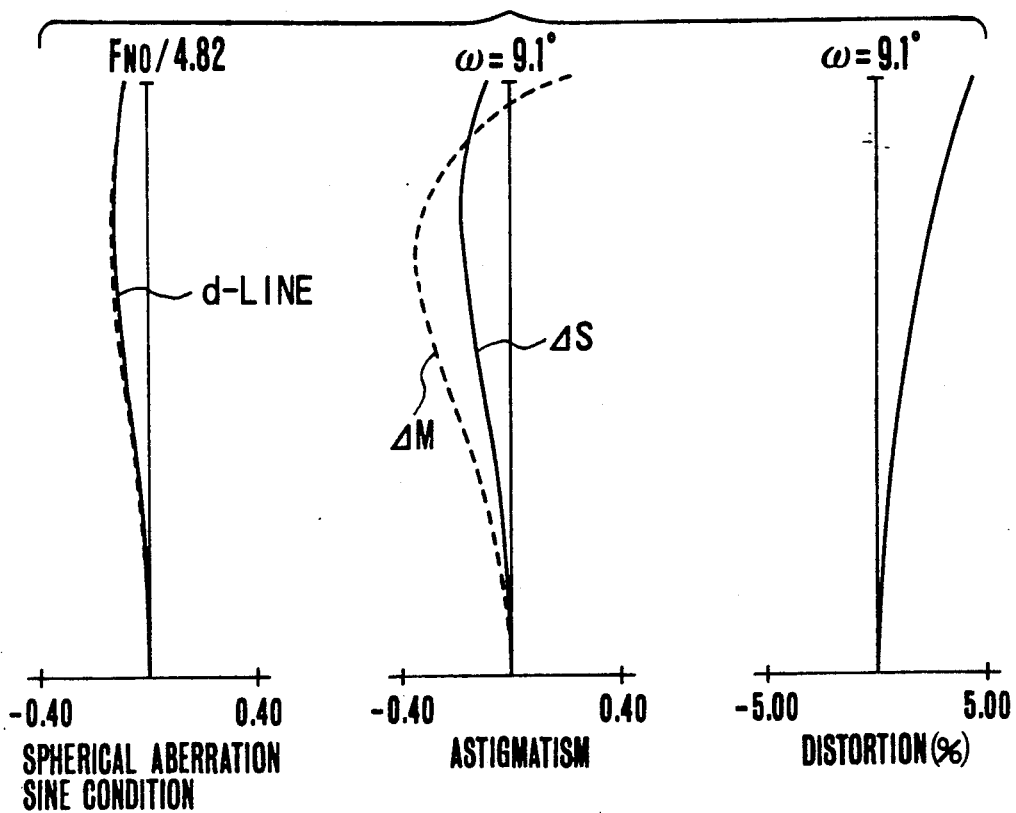
Figure 20C:
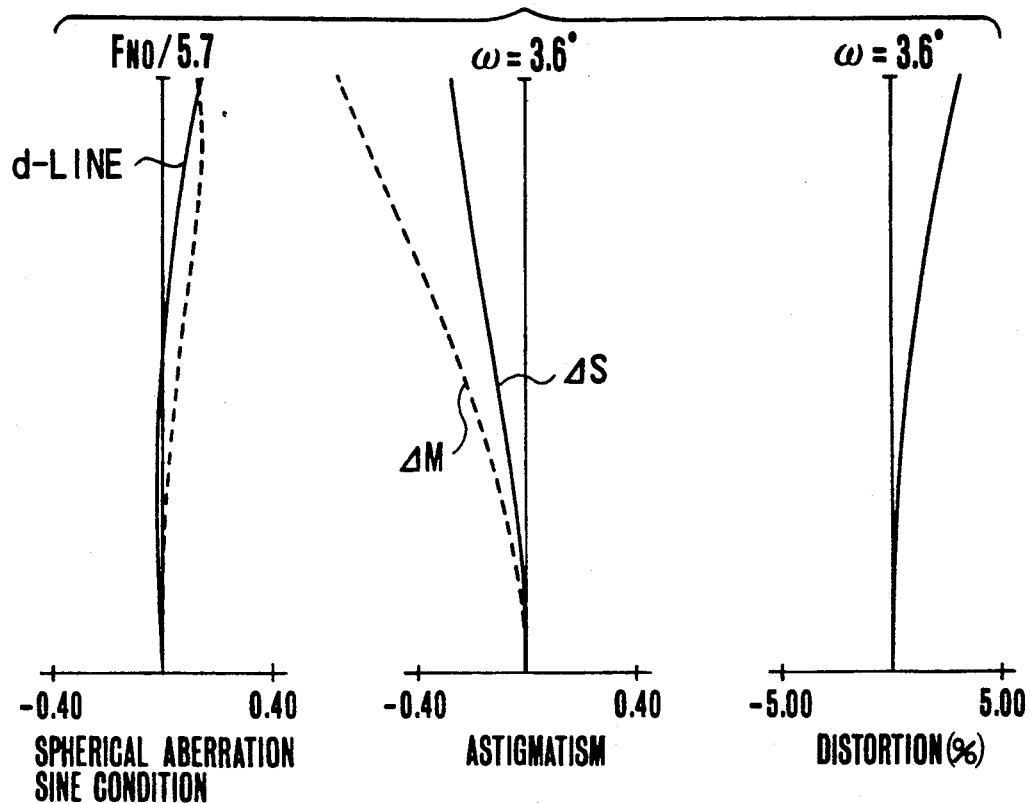
Figure 21A:
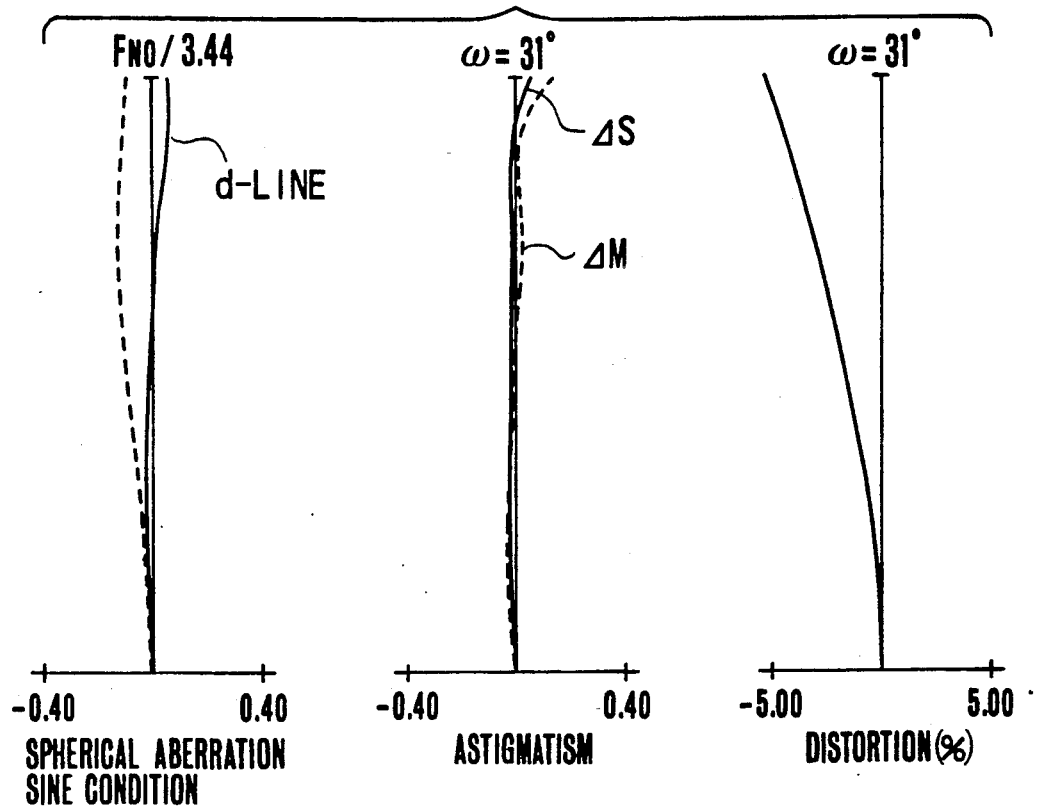
FIGS. 21(A), 21(B) and 21(C) are graphs of the various aberrations of the numerical example 10 concerning the invention.
Figure 21B:
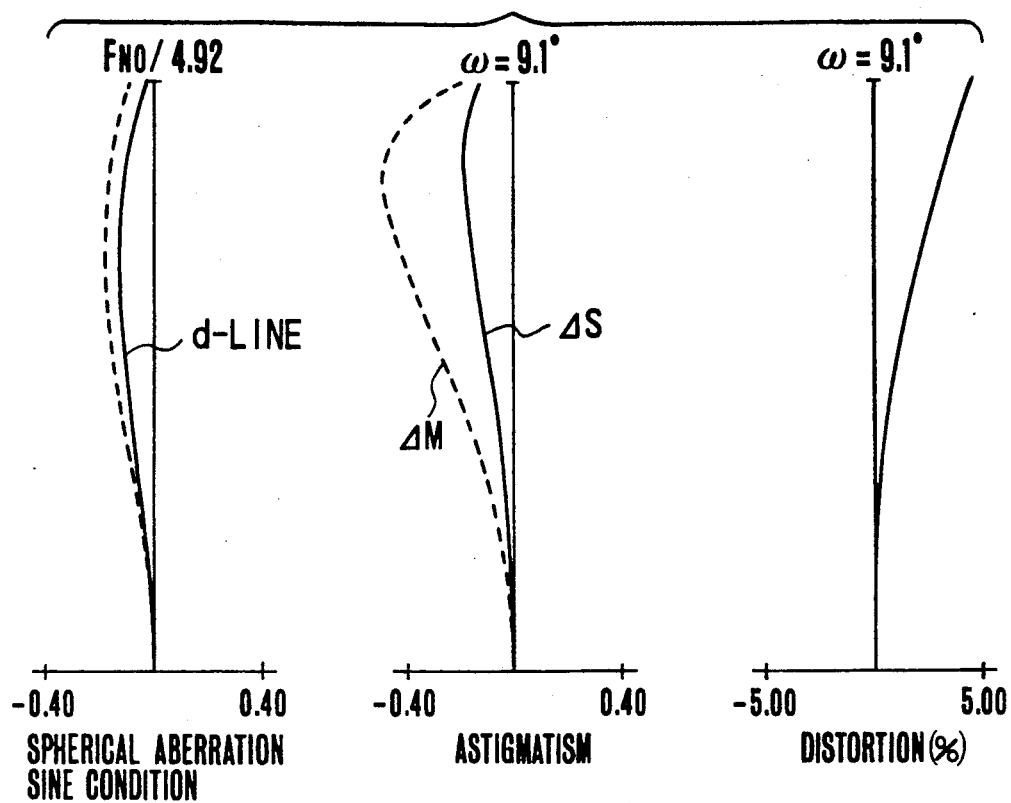
Figure 21C:
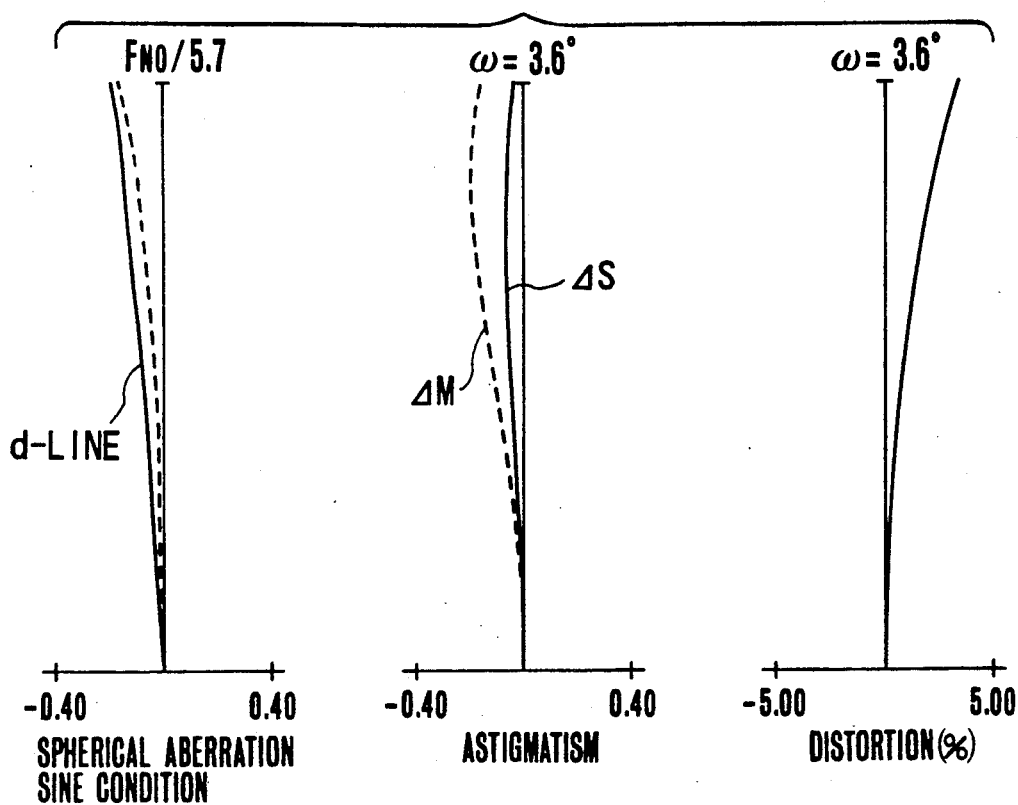

FIG. 1 to FIG. 11 show the lens block diagrams of the zoom lenses concerning the present invention. Particularly, FIG. 1 shows the paraxial arrangement and the optical paths of an on-axial light ray and an off-axial light ray in the zoom lens concerning the invention.

I denotes the first lens unit having a positive refractive power, II denotes the second lens unit having a negative refractive power, III denotes the third lens unit having a positive refractive power, IV denotes the fourth lens unit having a negative refractive power, V denotes the fifth lens unit having a positive refractive power and IV denotes the sixth lens unit having a negative refractive power. Zooming from the wide-angle end to the telephoto end is performed by tracing, on an optical axis, the motion loci shown by the dashed lines or arrows. That is, when the air separation between the i-th lens unit and the (i+1)st lens unit in the wide-angle end and the telephoto end are denoted by $D_{iW}$ and $D_{iT}$, respectively, zooming from the wide-angle end to the telephoto end is performed by moving each lens unit, or by making part of the lens units stationary, so as to satisfy the following conditions:

$D_1W < D_1T$ $D_2W > D_2T$ $D_3W < D_3T$ $D_4W > D_4T$

Also, $D_5W > D_5T$ is satisfied and further the sixth lens unit is made to move so as to position itself on the object side when in the position of the telephoto end as compared with the wide-angle end. Also, focusing is performed by moving the sixth lens unit. Also, S indicates a stop. The stop S is stationary relative to the third lens unit III.

In the present embodiment, at first, in the wide-angle end, the positive first lens unit and the negative second lens unit are made to come nearest to each other so that the composite refractive power ($f_{12}$) of the first lens unit and the second lens unit becomes negative ($f_{12}<0$). Also, the separation between the second and third lens units is made to be largest, the separation between the third and fourth lens units is made to be smallest, and, on its image side, the fifth lens unit by a space and the sixth lens unit by a further space are arranged. With the first lens unit and the second lens unit, their composite refractive power becomes negative, and, with the positive third lens unit and the negative fourth lens unit, the refractive power becomes relatively weak, and further with the use of the positive fifth lens unit and the negative sixth lens unit, the entirety is formed into the retrofocus type. By arranging the negative sixth lens unit in such a way, the aim of shortening the back focal distance is fulfilled with the result of shortening the total length. Along with this, by the sixth lens unit VI, the off-axial light ray is bent upward with the result that the outer diameters of the fourth, fifth and sixth lens units are minimized.

Next, in the telephoto end, the separation between the positive first lens unit and the negative second lens unit is largest, the separation between the negative second lens unit and the positive third lens unit is smallest, and further the negative fourth lens unit, the positive fifth lens unit and the negative sixth lens unit are arranged in the most approached states to each other, so that, as a whole, the lens form is of high telephoto ratio. Thus, a shortening of the total length of the lens is attained.

Next, explanation is given to the conversion of the outer diameter of the lens to compact form. In general, in the high variable magnification range zoom lens including the wide-angle region, a lens group of the largest outer diameter is the first lens unit. Here, as shown in FIG. 1, as the elements of determining the outer diameter of the first lens unit, there are the off-axial light ray in the wide-angle end and the on-axial $F_{No}$ light ray in the telephoto end. When the full-aperture F-number is denoted by $F_{No}$, the diameter of the on-axial $F_{NO}$ light ray by D, and the focal length of the entire lens system by f, the following formula is established:

$f_{No}=f/D$

The effective diameter of the first lens unit in the telephoto end is automatically determined by the height of pass of the on-axial $F_{No}$ light ray. On the other hand, the effective diameter in the wide-angle end depends on the off-axial light ray incident on the first lens unit. Because the inclination of this light ray is very large, it becomes difficult to lessen the outer diameter of the first lens unit to a small value while securing the off-axial light beam in the wide-angle end. To cope with this difficulty, in the present embodiment, the composite negative refractive power of the first lens unit and the second lens unit is made strong. In other words, the negative refractive power of the second lens unit is made strong. Also, the lens separation $D_{2W}$ in the wide-angle end is made as small as possible so that the off-axial light rays passes through as near a position of the first lens unit as possible.

By the way, when the negative refractive power of the second lens unit is made strong, the lens system becomes the retrofocus type, particularly, in the wide-angle end, so that the back focal distance becomes longer than necessary. The total length of the optics (the distance from the first lens surface to the image plane) tends to become long.

In the present invention, it is desirable that this tendency is canceled by letting the second lens unit and the sixth lens unit have such negative refractive powers as to satisfy the following conditions:

$0.1 < |f_6/f_T| 0.5$ (1)

and/or $1.5 < |f_6/f_2| < 6.0$ (2)

where $f_2$ and $f_6$ are the focal lengths of the second lens unit and the sixth lens unit, respectively, and $f_T$ is the focal length of the entire lens system in the telephoto end. This leads to the aim of turning the total length to compact form. Also, to make small the lens separation $D_{2W}$ means to make small the amount of movement with zooming of the air separation of the second lens unit and the third lens unit. Therefore, the magnification varying effect of the third lens unit becomes small. But, in the present invention, the entire lens system is constructed with the six lens units and by making each of the lens units that follow the second lens unit to share the magnification varying effect, the aim of increasing the variable magnification range is attained.

The inequalities of condition (1) are to regulate the focal length of the sixth lens unit in relation to the longest focal length of the entire lens system. When the refractive power of the sixth lens unit gets stronger than the lower limit, the aberrations, particularly, distortion in the telephoto end, worsen. When the upper limit is exceeded, the magnification varying effect of the sixth lens unit becomes small. To satisfy the magnification variation ratio of the entire lens system, the amount of movement of each lens unit increases. It is not preferable to have the total length elongated. Further, more desirably, if a condition of $D_{5W} > D_{5T}$ is satisfied, it is really good.

The inequalities of condition (2) are to regulate the focal length of the sixth lens unit in relation to the focal length of the second lens unit. When the refractive power of the sixth lens unit gets stronger than the lower limit, the tendency to the telephoto type over the entire lens system becomes strong. Therefore, although the total length becomes short, it becomes difficult to secure the necessary back focal distance. When the upper limit is exceeded, the tendency to the retrofocus type over the entire lens system becomes strong, causing the total length to increase objectionably.

Also, in the present invention, it is preferable to further satisfy the following conditions:

$$0.26 < f_1/f_T < 0.88 \quad (3)$$

$$0.11 < |f_2|/f_1 < 0.31 \quad (4)$$

$$0.08 < f_5/f_T < 0.3 \quad (5)$$

where $f_1$ and $f_5$ are the focal lengths of the first lens unit and the fifth lens unit, respectively.

Further, it is preferable to satisfy the following conditions:

$$1.1 < f_3/|f_2| < 3.7 \quad (6)$$

$$0.15 < (D_{1T} - D_{1W})/f_T < 0.3 \quad (7)$$

$$0.07 < (D_{2W} - D_{2T})/f_T < 0.2 \quad (8)$$

where $f_3$ is the focal length of the third unit.

It is also preferable that the second lens unit has at least two negative lenses and at least one positive lens, the lens on the most object side being the negative lens, and, when the radii of curvature on the object side and the image side of this negative lens are denoted by $r_{21}$ and $r_{22}$, satisfies the following condition:

$$|r_{22}/r_{21}| < 0.23 \quad (9)$$

It is also preferable to form the fifth lens unit in such a manner that it has at least two positive lenses and at least one negative lens, the lens surface nearest to the object side being concave toward the object side.

Next, the significances of the above-described conditions are explained.

The inequalities of condition (3) are to regulate the focal length of the first lens unit in relation to the focal length of the entire lens system in the telephoto end. When the positive refractive power of the first lens unit gets stronger than the lower limit, it is advantageous for shortening the total length, but the outer diameter of the first lens unit becomes large to secure the off-axial light bundle in the wide-angle end, and further the aberrations become difficult to correct. When the positive refractive power of the first lens unit gets weaker than the upper limit, the outer diameter of the first lens unit becomes small, but the total length becomes objectionably long.

The inequalities of condition (4) are, under the condition (3), to regulate the focal length of the second lens unit in relation to the focal length of the first lens unit. When the negative refractive power of the second lens unit gets stronger than the lower limit, the outer diameter of the first lens unit can be made small, but the back focal distance becomes longer than necessary, causing the total length to become long. Further, the various aberrations which are produced in the second lens unit, particularly, spherical aberration and distortion, become difficult to correct in good balance. When the negative refractive power of the second lens unit gets weaker than the upper limit, it is favorable on the aberration correction, but the outer diameter of the first lens unit increases so that the compact form becomes difficult to achieve.

The inequalities of condition (5) are to regulate the focal length of the fifth lens unit in relation to the focal length of the entire lens system in the telephoto end. When the refractive power of the fifth lens unit gets stronger than the lower limit, it is advantageous for making the outer diameters of the fifth and sixth lens units to compact form, the various aberrations which are produced in the fifth lens unit become too large and those are difficult to correct by the other lens units. When the positive refractive power of the fifth lens unit gets weaker than the upper limit, the outer diameters of the fifth and sixth lens units increase, and the total length, too, becomes objectionably long.

The inequalities of condition (6) are to regulate the focal length of the third lens unit in relation to the focal length of the second lens unit. When the positive refractive power of the third lens unit gets stronger than the lower limit, it is advantageous for making the total length of the entire lens system and the outer diameters of the fourth, fifth and sixth lens units to compact form, but the various aberrations which are produced in the third lens unit become large and those are difficult to correct. When the positive refractive power of the third lens unit gets weaker than the upper limit, the total length of the entire lens system and the outer diameters of the fourth, fifth and sixth lens units become objectionably long.

The inequalities of condition (7) are to regulate the difference between the air separations in the telephoto end and the wide-angle end between the first and second lens units in relation to the focal length of the telephoto end, in other words, the amount of variation with zooming of the separation between the first and second lens units. When the amount of variation of the separation gets smaller than the lower limit, the magnification varying effect of the second lens unit becomes small. To obtain the prescribed ratio of magnification change, a necessity of varying the air separation between the other lens units arises. To take the space for this purpose in the wide-angle end, the total length of the entire lens system in the wide-angle end is caused to increase. When the amount of variation of the separation gets larger than the upper limit, the magnification varying effect of the second lens unit becomes large. It is advantageous for increasing the range of magnifications. However, to secure the sufficient off-axial light bundle in the telephoto end, the outer diameter of the first lens unit or the fourth, fifth and sixth lens units is caused to increase.

The inequalities of condition (8) are to regulate the difference between the air separations in the wide-angle end and the telephoto end between the second and third lens units, in other words, the amount of variation with zooming of the separation between the second and third lens units. When the amount of variation of the separation gets smaller than the lower limit, it is advantageous for reducing the outer diameter of the first lens unit to a minimum, but a necessity of largely varying the air separation between the fourth and fifth lens units arises. This space has to be previously secured in the wide angle end. The separation between the fourth lens unit and the fifth lens unit widens in the wide-angle end. To secure the off-axial light bundle, the outer diameter of the fifth lens unit is caused to increase. When the amount of variation of the separation gets larger than the upper limit, it is advantageous for increasing the range of magnifications, but means that the separation between the second and third lens units in the wide-angle end becomes large. To secure the off-axial light bundle, the outer diameter of the first lens unit becomes objectionably large.

Further, the second lens unit is a lens unit having a strong negative refractive power compared with the focal length of the entire lens system in the telephoto end. For this reason, to minimize the various aberrations which are produced in the second lens unit, it is preferable that the second lens unit is constructed with at least two negative lenses and at least one positive lens, and that, particularly, the negative lens nearest to the object side is made to satisfy the condition (9). The inequality of condition (9) is to regulate the ratio of the radii of curvature of the lens nearest to the object side of the second lens unit. That the radius $r_{22}$ gets gentler than the upper limit as compared with the radius $r_{21}$, means that the negative refractive power of the aforesaid negative lens becomes weak. For this reason, to let the second lens unit have a prescribed refractive power, the radius of curvature of the other negative lens would become tight, or the number of lens elements would increase. In the former case, production of the various aberrations becomes remarkable. In the latter case, the second lens unit becomes thick. To secure the off-axial light bundle in the wide-angle end, therefore, the outer diameter of the first lens unit is caused to increase.

By the way, in the present invention, the diameter of the first lens unit is minimized and, at the same time, focusing is performed by moving the sixth lens unit having the negative refractive power along the optical axis in order that the focusing can be performed up to the minimum distance. In the present embodiment, even when zooming from the wide-angle end to the telephoto end, the sixth lens unit is made to move toward the object side. By this arrangement, the sensitivity of the sixth lens unit that is the focusing lens unit is made large on the telephoto side so that the amount of forward movement for focusing is smaller than in the case where the sixth lens unit is stationary during zooming.

In the present invention, letting the focal length of the sixth lens unit be denoted by $f_6$, the distance from the last lens surface to the image plane when focusing on an infinitely distant object in the wide-angle end by $D_{6W}$ and the distance from the last lens surface to the image plane when focusing on an infinitely distant object in the telephoto end by $D_{6T}$, the following conditions are satisfied:

$$0.65 < |f_6|/D_{6W} < 2.6 \qquad (10)$$

$$0.5 < D_{6T}/|f_6| < 2.6 \qquad (11)$$

The inequalities of condition (10) are to regulate the focal length of the sixth lens unit in relation to the distance from the lens surface nearest to the image side of the sixth lens unit to the image plane in the wide-angle end with an object at infinity. When the focal length of the sixth lens unit gets shorter than the lower limit, the sensitivity of the sixth lens unit becomes large, and the space for focusing in the wide-angle end becomes small. It is advantageous for making the total length to compact form. However, the various aberrations which are produced in the sixth lens unit, particularly, spherical aberration, become large. Thus, it becomes difficult to suppress the variation of the aberrations with focusing to minimum. When the focal length of the sixth lens unit gets longer than the upper limit of the condition (10), the variation of the aberrations with focusing becomes small, but the tendency to the telephoto type of the entire lens system weakens, causing the total length to increase.

The inequalities of condition (11) are, under the condition (10), to regulate the distance from the lens surface nearest to the image side of the sixth lens unit to the image plane in the telephoto end with an object at infinity in relation to the focal length of the six lens unit. When the separation $D_{6T}$ gets smaller than the lower limit of the condition (11), the sensitivity of the sixth lens unit in the telephoto end becomes small, so that the amount of focusing forward movement of the sixth lens unit comes to increase. When the separation $D_{6T}$ gets larger than the upper limit, the sensitivity of the sixth lens unit in the telephoto end becomes large, so that the amount of focusing forward movement can be minimized. However, the accuracy of position determination during the automatic focusing comes to be severe.

It is to be noted that although the invention has been described with the center in the zoom lens comprising at least 6 units, an additional lens unit may be arranged behind the sixth lens unit. Also, this embodiment is added.

Next, numerical examples of the invention are shown. In the numerical examples, Ri is the radius of curvature of the i-th lens surface in the order from the object side. Di is the i-th lens thickness or air separation from the object side. Ni and νi are respectively the refractive index and Abbe number of the glass of the i-th lens element in the order from the object side.

NUMERICAL EXAMPLE 1

(FIGS. 2, 12(A), 12(B) and 12(C))

| | F = 36 - 342 | FNO = 1:3.4 - 5.7 | 2ω = 62° - 7.2° | |
|---|---|---|---|---|
| R1 = | 150.450 | D1 = 3.00 | N1 = 1.83400 | ν1 = 37.2 |
| R2 = | 76.152 | D2 = 9.00 | N2 = 1.49700 | ν2 = 81.6 |
| R3 = | −537.229 | D3 = 0.20 | | |
| R4 = | 73.104 | D4 = 6.80 | N3 = 1.49700 | ν3 = 81.6 |
| R5 = | 702.421 | D5 = Variable | | |
| R6 = | 4226.250 | D6 = 1.90 | N4 = 1.83481 | ν4 = 42.7 |
| R7 = | 29.462 | D7 = 6.40 | | |
| R8 = | −80.400 | D8 = 1.50 | N5 = 1.80400 | ν5 = 46.6 |

-continued

| | | | | |
|---|---|---|---|---|
| R9 = | 94.435 | D9 = 1.00 | | |
| R10 = | 50.436 | D10 = 5.50 | N6 = 1.84666 | $\nu 6$ = 23.9 |
| R11 = | −52.893 | D11 = 0.80 | | |
| R12 = | −50.059 | D12 = 1.50 | N7 = 1.80400 | $\nu 7$ = 46.6 |
| R13 = | 91.811 | D13 = Variable | | |
| R14 = | ∞ Stop | D14 = 1.00 | | |
| R15 = | 76.029 | D15 = 3.30 | N8 = 1.60311 | $\nu 8$ = 60.7 |
| R16 = | −77.554 | D16 = 0.20 | | |
| R17 = | 36.766 | D17 = 5.20 | N9 = 1.48749 | $\nu 9$ = 70.2 |
| R18 = | −62.813 | D18 = 1.50 | N10 = 1.84666 | $\nu 10$ = 23.9 |
| R19 = | 226.016 | D19 = Variable | | |
| R20 = | −46.308 | D20 = 1.50 | N11 = 1.70154 | $\nu 11$ = 41.2 |
| R21 = | 36.025 | D21 = 3.80 | N12 = 1.84666 | $\nu 12$ = 23.9 |
| R22 = | 376.495 | D22 = Variable | | |
| R23 = | −93.921 | D23 = 3.60 | N13 = 1.57250 | $\nu 13$ = 57.8 |
| R24 = | −34.975 | D24 = 0.20 | | |
| R25 = | 133.065 | D25 = 3.50 | N14 = 1.56384 | $\nu 14$ = 60.7 |
| R26 = | −88.913 | D26 = 0.20 | | |
| R27 = | 46.989 | D27 = 7.00 | N15 = 1.49700 | $\nu 15$ = 81.6 |
| R28 = | −33.873 | D28 = 1.80 | N16 = 1.83400 | $\nu 16$ = 37.2 |
| R29 = | −1443.511 | D29 = Variable | | |
| R30 = | 362.189 | D30 = 1.50 | N17 = 1.80400 | $\nu 17$ = 46.6 |
| R31 = | 45.926 | D31 = 2.00 | N18 = 1.77250 | $\nu 18$ = 49.6 |
| R32 = | 274.615 | D32 = 1.50 | | |
| R33 = | 87.145 | D33 = 3.00 | N19 = 1.78472 | $\nu 19$ = 25.7 |
| R34 = | ∞ | | | |

| Variable | Focal Length | | |
|---|---|---|---|
| Separation | 36.00 | 135.78 | 342.50 |
| D5 | 2.09 | 48.13 | 72.39 |
| D13 | 37.04 | 14.23 | 3.24 |
| D19 | 3.45 | 14.43 | 19.19 |
| D22 | 18.69 | 7.14 | 1.84 |
| D29 | 14.40 | 18.24 | 2.28 |

NUMERICAL EXAMPLE 2

(FIGS. 3, 13(A), 13(B) and 13(C))

| | F = 36 - 342 | FNO = 1:3.4 - 5.7 | $2\omega$ = 62° - 7.2° | |
|---|---|---|---|---|
| R1 = | 152.525 | D1 = 3.00 | N1 = 1.83400 | $\nu 1$ = 37.2 |
| R2 = | 76.259 | D2 = 0.90 | N2 = 1.49700 | $\nu 2$ = 81.6 |
| R3 = | 76.442 | D3 = 9.00 | | |
| R4 = | −460.709 | D4 = 0.20 | N3 = 1.49700 | $\nu 3$ = 81.6 |
| R5 = | 73.385 | D5 = 6.80 | | |
| R6 = | 622.761 | D6 = Variable | N4 = 1.83481 | $\nu 4$ = 42.7 |
| R7 = | 12695.598 | D7 = 1.90 | | |
| R8 = | 31.222 | D8 = 6.40 | N5 = 1.80400 | $\nu 5$ = 46.6 |
| R9 = | −86.957 | D9 = 1.50 | | |
| R10 = | 87.564 | D10 = 1.00 | N6 = 1.84666 | $\nu 6$ = 23.9 |
| R11 = | 51.367 | D11 = 5.50 | | |
| R12 = | −51.361 | D12 = 0.80 | N7 = 1.80400 | $\nu 7$ = 46.6 |
| R13 = | −49.759 | D13 = 1.50 | | |
| R14 = | 78.545 | D14 = Variable | | |
| R15 = | ∞ Stop | D15 = 1.00 | N8 = 1.60311 | $\nu 8$ = 60.7 |
| R16 = | 79.724 | D16 = 3.30 | | |
| R17 = | −78.464 | D17 = 0.20 | N9 = 1.48749 | $\nu 9$ = 70.2 |
| R18 = | 34.542 | D18 = 5.20 | N10 = 1.84666 | $\nu 10$ = 23.9 |
| R19 = | −65.248 | D19 = 1.50 | | |
| R20 = | 207.267 | D20 = Variable | N11 = 1.70154 | $\nu 11$ = 41.2 |
| R21 = | −47.264 | D21 = 1.50 | N12 = 1.84666 | $\nu 12$ = 23.9 |
| R22 = | 35.623 | D22 = 3.80 | | |
| R23 = | 321.252 | D23 = Variable | N13 = 1.57250 | $\nu 13$ = 57.8 |
| R24 = | −92.593 | D24 = 3.60 | | |
| R25 = | −34.689 | D25 = 0.20 | N14 = 1.56384 | $\nu 14$ = 60.7 |
| R26 = | 167.116 | D26 = 3.50 | | |
| R27 = | −82.404 | D27 = 0.20 | N15 = 1.49700 | $\nu 15$ = 81.6 |
| R28 = | 43.708 | D28 = 7.00 | N16 = 1.83400 | $\nu 16$ = 37.2 |
| R29 = | −33.910 | D29 = 1.80 | | |
| R30 = | 925.578 | D30 = Variable | N17 = 1.72825 | $\nu 17$ = 28.5 |
| R31 = | 116.459 | D31 = 3.20 | | |
| R32 = | −97.569 | D32 = 1.50 | N18 = 1.80400 | $\nu 18$ = 46.6 |
| R33 = | 45.298 | | | |

| Variable | Focal Length | | |
|---|---|---|---|
| Separation | 36.00 | 135.81 | 342.02 |
| D6 | 1.57 | 47.42 | 71.57 |
| D14 | 36.32 | 14.04 | 3.32 |
| D20 | 3.19 | 15.48 | 20.94 |

-continued

| | | | |
|---|---|---|---|
| D23 | 19.72 | 7.43 | 1.98 |
| D30 | 13.92 | 18.89 | 1.83 |

NUMERICAL EXAMPLE 3

(FIGS. 4, 14(A), 14(B) and 14(C))

| F = 36 - 342 | | FNO = 1:3.4 - 5.7 | | $2\omega = 62° - 7.2°$ | |
|---|---|---|---|---|---|
| R1 = | 151.212 | D1 = 3.00 | N1 = 1.83400 | $\nu1$ = 37.2 |
| R2 = | 76.906 | D2 = 9.00 | N2 = 1.49700 | $\nu2$ = 81.6 |
| R3 = | −508.877 | D3 = 0.20 | | |
| R4 = | 71.125 | D4 = 6.80 | N3 = 1.49700 | $\nu3$ = 81.6 |
| R5 = | 496.196 | D5 = Variable | | |
| R6 = | 245.904 | D6 = 1.90 | N4 = 1.83481 | $\nu4$ = 42.7 |
| R7 = | 29.199 | D7 = 6.40 | | |
| R8 = | −71.285 | D8 = 1.50 | N5 = 1.80400 | $\nu5$ = 46.6 |
| R9 = | 101.524 | D9 = 1.00 | | |
| R10 = | 50.586 | D10 = 5.40 | N6 = 1.84666 | $\nu6$ = 23.9 |
| R11 = | −55.915 | D11 = 0.50 | | |
| R12 = | −49.789 | D12 = 1.50 | N7 = 1.80400 | $\nu7$ = 46.6 |
| R13 = | 80.389 | D13 = Variable | | |
| R14 = | ∞ Stop | D14 = 1.00 | | |
| R15 = | 112.769 | D15 = 3.30 | N8 = 1.60311 | $\nu8$ = 60.7 |
| R16 = | −92.849 | D16 = 0.20 | | |
| R17 = | 38.578 | D17 = 5.20 | N9 = 1.49700 | $\nu9$ = 81.6 |
| R18 = | −51.195 | D18 = 1.50 | N10 = 1.84666 | $\nu10$ = 23.9 |
| R19 = | −448.310 | D19 = Variable | | |
| R20 = | −45.907 | D20 = 1.50 | N11 = 1.70154 | $\nu11$ = 41.2 |
| R21 = | 33.103 | D21 = 3.80 | N12 = 1.84666 | $\nu12$ = 23.9 |
| R22 = | 404.063 | D22 = Variable | | |
| R23 = | −252.843 | D23 = 3.60 | N13 = 1.53526 | $\nu13$ = 45.9 |
| R24 = | −37.437 | D24 = 0.20 | | |
| R25 = | 184.530 | D25 = 3.50 | N14 = 1.56444 | $\nu14$ = 43.8 |
| R26 = | −90.121 | D26 = 0.20 | | |
| R27 = | 53.324 | D27 = 7.00 | N15 = 1.51112 | $\nu15$ = 60.5 |
| R28 = | −31.366 | D28 = 1.80 | N16 = 1.80518 | $\nu16$ = 25.4 |
| R29 = | −1238.891 | D29 = Variable | | |
| R30 = | 119.230 | D30 = 3.20 | N17 = 1.69895 | $\nu17$ = 30.1 |
| R31 = | −51.835 | D31 = 1.50 | N18 = 1.80400 | $\nu18$ = 46.6 |
| R32 = | 48.272 | | | |

| Variable Separation | Focal Length | | |
|---|---|---|---|
| | 36.00 | 134.32 | 342.08 |
| D5 | 1.82 | 47.88 | 71.82 |
| D13 | 36.35 | 14.16 | 2.93 |
| D19 | 3.77 | 14.98 | 20.51 |
| D22 | 18.88 | 7.67 | 2.14 |
| D29 | 12.55 | 16.62 | 1.95 |

NUMERICAL EXAMPLE 4

(FIGS. 5, 15(A), 15(B) and 15(C))

| F = 36 - 342 | | FNO = 1:3.4 - 5.7 | | $2\omega = 62° - 7.2°$ | |
|---|---|---|---|---|---|
| R1 = | 151.328 | D1 = 3.00 | N1 = 1.83400 | $\nu1$ = 37.2 |
| R2 = | 76.323 | D2 = 9.00 | N2 = 1.49700 | $\nu2$ = 81.6 |
| R3 = | −517.234 | D3 = 0.20 | | |
| R4 = | 73.048 | D4 = 6.80 | N3 = 1.49700 | $\nu3$ = 81.6 |
| R5 = | 701.883 | D5 = Variable | | |
| R6 = | 3688.551 | D6 = 1.90 | N4 = 1.83481 | $\nu4$ = 42.7 |
| R7 = | 30.295 | D7 = 6.40 | | |
| R8 = | −81.938 | D8 = 1.50 | N5 = 1.80400 | $\nu5$ = 46.6 |
| R9 = | 86.344 | D9 = 1.00 | | |
| R10 = | 50.054 | D10 = 5.50 | N6 = 1.84666 | $\nu6$ = 23.9 |
| R11 = | −50.060 | D11 = 0.40 | | |
| R12 = | −48.791 | D12 = 1.50 | N7 = 1.80400 | $\nu7$ = 46.6 |
| R13 = | 77.118 | D13 = Variable | | |
| R14 = | ∞ Stop | D14 = 1.00 | | |
| R15 = | 80.689 | D15 = 3.30 | N8 = 1.60311 | $\nu8$ = 60.7 |
| R16 = | −78.145 | D16 = 0.20 | | |
| R17 = | 33.922 | D17 = 5.20 | N9 = 1.48749 | $\nu9$ = 70.2 |
| R18 = | −60.883 | D18 = 1.50 | N10 = 1.84666 | $\nu10$ = 23.9 |
| R19 = | 217.109 | D19 = Variable | | |
| R20 = | −48.964 | D20 = 1.50 | N11 = 1.70154 | $\nu11$ = 41.2 |
| R21 = | 33.635 | D21 = 3.80 | N12 = 1.84666 | $\nu12$ = 23.9 |
| R22 = | 306.347 | D22 = Variable | | |
| R23 = | −93.044 | D23 = 3.60 | N13 = 1.57250 | $\nu13$ = 57.8 |
| R24 = | −34.640 | D24 = 0.20 | | |
| R25 = | 149.086 | D25 = 3.50 | N14 = 1.56384 | $\nu14$ = 60.7 |

-continued

| | | | |
|---|---|---|---|
| R26 = −84.511 | D26 = 0.20 | | |
| R27 = 43.403 | D27 = 7.00 | N15 = 1.49700 | ν15 = 81.6 |
| R28 = −32.741 | D28 = 1.80 | N16 = 1.83400 | ν16 = 37.2 |
| R29 = 727.720 | D29 = Variable | | |
| R30 = 119.953 | D30 = 3.20 | N17 = 1.72825 | ν17 = 28.5 |
| R31 = −102.395 | D31 = 1.50 | N18 = 1.80400 | ν18 = 46.6 |
| R32 = 45.937 | D32 = Variable | | |
| R33 = 800.000 | D33 = 2.00 | N19 = 1.60311 | ν19 = 60.7 |
| R34 = 500.000 | | | |

| Variable Separation | Focal Length | | |
|---|---|---|---|
| | 36.38 | 135.94 | 342.60 |
| D5 | 1.91 | 47.76 | 71.91 |
| D13 | 36.53 | 14.25 | 3.53 |
| D19 | 3.21 | 14.80 | 19.89 |
| D22 | 19.02 | 7.43 | 2.34 |
| D29 | 12.21 | 17.91 | 2.05 |
| D32 | 7.98 | 24.56 | 51.15 |

NUMERICAL EXAMPLE 5
(FIGS. 6, 16(A), 16(B) and 16(C))

| F = 36 − 342 | FNO = 1:3.4 − 5.7 | 2ω = 62° − 7.2° | |
|---|---|---|---|
| R1 = 150.465 | D1 = 3.00 | N1 = 1.83400 | ν1 = 37.2 |
| R2 = 75.765 | D2 = 9.00 | N2 = 1.49700 | ν2 = 81.6 |
| R3 = −554.123 | D3 = 0.20 | | |
| R4 = 72.396 | D4 = 6.80 | N3 = 1.49700 | ν3 = 81.6 |
| R5 = 675.476 | D5 = Variable | | |
| R6 = 2263.624 | D6 = 1.90 | N4 = 1.83481 | ν4 = 42.7 |
| R7 = 28.724 | D7 = 6.40 | | |
| R8 = −88.074 | D8 = 1.50 | N5 = 1.80400 | ν5 = 46.6 |
| R9 = 88.753 | D9 = 1.00 | | |
| R10 = 48.351 | D10 = 5.50 | N6 = 1.84666 | ν6 = 23.9 |
| R11 = −55.339 | D11 = 0.80 | | |
| R12 = −50.526 | D12 = 1.50 | N7 = 1.80400 | ν7 = 46.6 |
| R13 = 92.110 | D13 = Variable | | |
| R14 = ∞ Stop | D14 = 1.00 | | |
| R15 = 82.762 | D15 = 3.30 | N8 = 1.60311 | ν8 = 60.7 |
| R16 = −73.207 | D16 = 0.20 | | |
| R17 = 35.639 | D17 = 5.20 | N9 = 1.48749 | ν9 = 70.2 |
| R18 = −69.026 | D18 = 1.50 | N10 = 1.84666 | ν10 = 23.9 |
| R19 = 201.032 | D19 = Variable | | |
| R20 = −45.209 | D20 = 1.50 | N11 = 1.70154 | ν11 = 41.2 |
| R21 = 36.385 | D21 = 3.80 | N12 = 1.84666 | ν12 = 23.9 |
| R22 = 368.288 | D22 = Variable | | |
| R23 = −93.903 | D23 = 3.60 | N13 = 1.57250 | ν13 = 57.8 |
| R24 = −34.464 | D24 = 0.20 | | |
| R25 = 172.252 | D25 = 3.50 | N14 = 1.56384 | ν14 = 60.7 |
| R26 = −85.584 | D26 = 0.20 | | |
| R27 = 47.027 | D27 = 7.00 | N15 = 1.49700 | ν15 = 81.6 |
| R28 = −33.516 | D28 = 1.80 | N16 = 1.83400 | ν16 = 37.2 |
| R29 = −2606.961 | D29 = Variable | | |
| R30 = 384.741 | D30 = 1.50 | N17 = 1.80400 | ν17 = 46.6 |
| R31 = 49.296 | D31 = 2.00 | | |
| R32 = 262.625 | D32 = 1.50 | N18 = 1.77250 | ν18 = 49.6 |
| R33 = 94.644 | D33 = 3.00 | N19 = 1.80518 | ν19 = 25.4 |
| R34 = ∞ | | | |

| Variable Separation | Focal Length | | |
|---|---|---|---|
| | 36.00 | 135.15 | 342.03 |
| D5 | 2.51 | 48.55 | 72.81 |
| D13 | 37.04 | 14.23 | 3.24 |
| D19 | 3.41 | 15.47 | 20.80 |
| D22 | 18.37 | 7.11 | 1.98 |
| D29 | 16.35 | 21.04 | 1.36 |

NUMERICAL EXAMPLE 6
(FIGS. 7, 17(A), 17(B) and 17(C))

| F = 36.2 − 342 | FNO = 1:3.4 − 5.7 | 2ω = 62° − 7.2° | |
|---|---|---|---|
| R1 = 150.932 | D1 = 3.00 | N1 = 1.83400 | ν1 = 37.2 |
| R2 = 76.351 | D2 = 9.00 | N2 = 1.49700 | ν2 = 81.6 |
| R3 = −517.376 | D3 = 0.20 | | |
| R4 = 72.811 | D4 = 6.80 | N3 = 1.49700 | ν3 = 81.6 |
| R5 = 666.312 | D5 = Variable | | |
| R6 = 2620.276 | D6 = 1.90 | N4 = 1.83481 | ν4 = 42.7 |
| R7 = 30.650 | D7 = 6.40 | | |

-continued

| | | | | | |
|---|---|---|---|---|---|
| R8 = | −82.213 | D8 = 1.50 | N5 = 1.80400 | ν5 = 46.6 |
| R9 = | 88.100 | D9 = 1.00 | | |
| R10 = | 50.008 | D10 = 5.50 | N6 = 1.84666 | ν6 = 23.9 |
| R11 = | −49.858 | D11 = 0.40 | | |
| R12 = | −49.128 | D12 = 1.50 | N7 = 1.80400 | ν7 = 46.6 |
| R13 = | 72.028 | D13 = Variable | | |
| R14 = | ∞ Stop | D14 = 1.00 | | |
| R15 = | 79.236 | D15 = 3.30 | N8 = 1.60311 | ν8 = 60.7 |
| R16 = | −78.812 | D16 = 0.20 | | |
| R17 = | 33.644 | D17 = 5.20 | N9 = 1.48749 | ν9 = 70.2 |
| R18 = | −60.612 | D18 = 1.50 | N10 = 1.84666 | ν10 = 23.9 |
| R19 = | 205.705 | D19 = Variable | | |
| R20 = | −48.716 | D20 = 1.50 | N11 = 1.70154 | ν11 = 41.2 |
| R21 = | 33.505 | D21 = 3.80 | N12 = 1.84666 | ν12 = 23.9 |
| R22 = | 311.637 | D22 = Variable | | |
| R23 = | −92.861 | D23 = 3.60 | N13 = 1.57250 | ν13 = 57.8 |
| R24 = | −34.629 | D24 = 0.20 | | |
| R25 = | 145.251 | D25 = 3.50 | N14 = 1.56384 | ν14 = 60.7 |
| R26 = | −84.507 | D26 = 0.20 | | |
| R27 = | 43.361 | D27 = 7.00 | N15 = 1.49700 | ν15 = 81.6 |
| R28 = | −32.770 | D28 = 1.80 | N16 = 1.83400 | ν16 = 37.2 |
| R29 = | 644.721 | D29 = Variable | | |
| R30 = | 124.356 | D30 = 3.20 | N17 = 1.72825 | ν17 = 28.5 |
| R31 = | −96.916 | D31 = 1.50 | N18 = 1.80400 | ν18 = 46.6 |
| R32 = | 46.873 | | | |

| Variable | Focal Length | | |
| Separation | 36.00 | 135.13 | 342.08 |
|---|---|---|---|
| D5 | 1.90 | 47.75 | 71.90 |
| D13 | 36.38 | 14.10 | 3.38 |
| D19 | 3.41 | 15.24 | 20.46 |
| D22 | 19.09 | 7.26 | 2.04 |
| D29 | 12.46 | 18.56 | 1.99 |

NUMERICAL EXAMPLE 7

(FIGS. 8, 18(A), 18(B) and 18(C))

| F = 36.2 - 342 | FNO = 1:3.4 - 5.7 | 2ω = 61° - 7° | | |
|---|---|---|---|---|
| R1 = | 174.603 | D1 = 3.00 | N1 = 1.83400 | ν1 = 37.2 |
| R2 = | 84.283 | D2 = 0.12 | | |
| R3 = | 84.348 | D3 = 9.30 | N2 = 1.49700 | ν2 = 81.6 |
| R4 = | −330.569 | D4 = 0.15 | | |
| R5 = | 72.746 | D5 = 7.00 | N3 = 1.49700 | ν3 = 81.6 |
| R6 = | 354.096 | D6 = Variable | | |
| R7 = | 105.889 | D7 = 1.90 | N4 = 1.88300 | ν4 = 40.8 |
| R8 = | 30.752 | D8 = 5.00 | | |
| R9 = | −374.461 | D9 = 1.50 | N5 = 1.80400 | ν5 = 46.6 |
| R10 = | 35.598 | D10 = 4.10 | N6 = 1.69895 | ν6 = 30.1 |
| R11 = | −3452.135 | D11 = 2.60 | | |
| R12 = | −43.226 | D12 = 1.60 | N7 = 1.83481 | ν7 = 42.7 |
| R13 = | 43.226 | D13 = 3.90 | N8 = 1.84666 | ν8 = 23.9 |
| R14 = | −179.163 | D14 = Variable | | |
| R15 = | ∞ Stop | D15 = 1.10 | | |
| R16 = | 178.565 | D16 = 2.50 | N9 = 1.65160 | ν9 = 58.5 |
| R17 = | −86.703 | D17 = 0.15 | | |
| R18 = | 44.230 | D18 = 5.10 | N10 = 1.51112 | ν10 = 60.5 |
| R19 = | −44.230 | D19 = 0.12 | | |
| R20 = | −43.131 | D20 = 1.50 | N11 = 1.68893 | ν11 = 31.1 |
| R21 = | −1170.951 | D21 = Variable | | |
| R22 = | −55.745 | D22 = 2.00 | N12 = 1.65160 | ν12 = 58.5 |
| R23 = | 31.534 | D23 = 3.60 | N13 = 1.85026 | ν13 = 32.3 |
| R24 = | 160.788 | D24 = Variable | | |
| R25 = | −385.105 | D25 = 1.50 | N14 = 1.84666 | ν14 = 23.9 |
| R26 = | 84.584 | D26 = 5.30 | N15 = 1.51633 | ν15 = 64.1 |
| R27 = | −44.321 | D27 = 0.15 | | |
| R28 = | 71.035 | D28 = 4.40 | N16 = 1.60311 | ν16 = 60.7 |
| R29 = | −78.923 | D29 = 0.15 | | |
| R30 = | 42.674 | D30 = 6.80 | N17 = 1.48749 | ν17 = 70.2 |
| R31 = | −42.674 | D31 = 1.50 | N18 = 1.83481 | ν18 = 42.7 |
| R32 = | −3581.258 | D32 = Variable | | |
| R33 = | −367.086 | D33 = 1.50 | N19 = 1.83481 | ν19 = 42.7 |
| R34 = | 38.786 | D34 = 3.30 | | |
| R35 = | −157.328 | D35 = 1.50 | N20 = 1.80610 | ν20 = 40.9 |
| R36 = | 79.222 | D36 = 0.80 | | |
| R37 = | 59.228 | D37 = 4.80 | N21 = 1.69895 | ν21 = 30.1 |
| R38 = | −70.130 | | | |

| Variable | Focal Length |

-continued

| Separation | 36.29 | 135.23 | 342.08 |
|---|---|---|---|
| D6 | 1.81 | 50.04 | 76.81 |
| D14 | 38.38 | 12.40 | 2.77 |
| D21 | 2.78 | 12.20 | 19.10 |
| D24 | 18.48 | 8.35 | 2.61 |
| D32 | 6.36 | 10.47 | 2.31 |

NUMERICAL EXAMPLE 8
(FIGS. 9, 19(A), 19(B) and 19(C))

| F = 36 - 342.5 | FNO = 1:3.4 - 5.7 | 2ω = 62° - 7.2° | |
|---|---|---|---|
| R1 = 150.454 | D1 = 3.00 | N1 = 1.83400 | ν1 = 37.2 |
| R2 = 76.161 | D2 = 9.00 | N2 = 1.46700 | ν2 = 81.6 |
| R3 = −535.000 | D3 = 0.20 | | |
| R4 = 73.208 | D4 = 6.80 | N3 = 1.49700 | ν3 = 81.6 |
| R5 = 688.044 | D5 = Variable | | |
| R6 = 4487.277 | D6 = 1.90 | N4 = 1.83481 | ν4 = 42.7 |
| R7 = 29.607 | D7 = 6.40 | | |
| R8 = −79.843 | D8 = 1.50 | N5 = 1.80400 | ν5 = 46.6 |
| R9 = 92.957 | D9 = 1.00 | | |
| R10 = 51.272 | D10 = 5.50 | N6 = 1.84666 | ν6 = 23.9 |
| R11 = −53.214 | D11 = 0.80 | | |
| R12 = −50.955 | D12 = 1.50 | N7 = 1.80400 | ν7 = 46.6 |
| R13 = 93.576 | D13 = Variable | | |
| R14 = ∞ Stop | D14 = 1.00 | | |
| R15 = 76.260 | D15 = 3.30 | N8 = 1.60311 | ν8 = 60.7 |
| R16 = −77.588 | D16 = 0.20 | | |
| R17 = 37.128 | D17 = 5.20 | N9 = 1.48749 | ν9 = 70.2 |
| R18 = −63.248 | D18 = 1.50 | N10 = 1.84666 | ν10 = 23.9 |
| R19 = 260.156 | D19 = Variable | | |
| R20 = −46.686 | D20 = 1.50 | N11 = 1.70154 | ν11 = 41.2 |
| R21 = 36.228 | D21 = 3.80 | N12 = 1.84666 | ν12 = 23.9 |
| R22 = 375.421 | D22 = Variable | | |
| R23 = −93.888 | D23 = 3.60 | N13 = 1.57250 | ν13 = 57.8 |
| R24 = −34.970 | D24 = 0.20 | | |
| R25 = 132.184 | D25 = 3.50 | N14 = 1.56384 | ν14 = 60.7 |
| R26 = −87.468 | D26 = 0.20 | | |
| R27 = 47.029 | D27 = 7.00 | N15 = 1.49700 | ν15 = 81.6 |
| R28 = −33.760 | D28 = 1.80 | N16 = 1.83400 | ν16 = 37.2 |
| R29 = 1534.687 | D29 = Variable | | |
| R30 = 319.747 | D30 = 1.50 | N17 = 1.80400 | ν17 = 46.6 |
| R31 = 47.717 | D31 = 2.00 | N18 = 1.77250 | ν18 = 49.6 |
| R32 = 311.320 | D32 = 1.50 | | |
| R33 = 85.055 | D33 = 3.00 | N19 = 1.78472 | ν19 = 25.7 |
| R34 = ∞ | | | |

| Variable | Focal Length | | |
|---|---|---|---|
| Separation | 36.00 | 136.17 | 342.49 |
| D5 | 2.08 | 48.12 | 72.38 |
| D13 | 37.04 | 14.23 | 3.24 |
| D19 | 3.36 | 14.82 | 19.83 |
| D22 | 19.32 | 7.29 | 1.74 |
| D29 | 15.35 | 19.24 | 2.01 |

NUMERICAL EXAMPLE 9
(FIGS. 10, 20(A), 20(B) and 20(C))

| F = 36 - 341.9 | FNO = 1:3.4 - 5.7 | 2ω = 62° - 7.2° | |
|---|---|---|---|
| R1 = 163.039 | D1 = 3.00 | N1 = 1.83400 | ν1 = 37.2 |
| R2 = 75.046 | D2 = 9.00 | N2 = 1.43387 | ν2 = 95.1 |
| R3 = −309.575 | D3 = 0.20 | | |
| R4 = 69.657 | D4 = 6.80 | N3 = 1.51633 | ν3 = 64.1 |
| R5 = 980.529 | D5 = Variable | | |
| R6 = 1186.981 | D6 = 1.90 | N4 = 1.83481 | ν4 = 42.7 |
| R7 = 34.704 | D7 = 6.40 | | |
| R8 = −94.455 | D8 = 1.50 | N5 = 1.80400 | ν5 = 46.6 |
| R9 = 63.893 | D9 = 1.00 | | |
| R10 = 49.378 | D10 = 5.50 | N6 = 1.84666 | ν6 = 23.9 |
| R11 = −55.159 | D11 = 0.80 | | |
| R12 = −55.378 | D12 = 1.50 | N7 = 1.80400 | ν7 = 46.6 |
| R13 = 68.197 | D13 = Variable | | |
| R14 = ∞ Stop | D14 = 1.00 | | |
| R15 = 77.790 | D15 = 3.30 | N8 = 1.61800 | ν8 = 63.4 |
| R16 = −102.393 | D16 = 0.20 | | |
| R17 = 35.204 | D17 = 5.20 | N9 = 1.48749 | ν9 = 70.2 |
| R18 = −64.255 | D18 = 1.50 | N10 = 1.84666 | ν10 = 23.9 |
| R19 = 286.183 | D19 = Variable | | |

-continued

| | | | |
|---|---|---|---|
| R20 = −46.805 | D20 = 1.50 | N11 = 1.70200 | ν11 = 40.1 |
| R21 = 34.964 | D21 = 3.80 | N12 = 1.84666 | ν12 = 23.9 |
| R22 = 502.251 | D22 = Variable | | |
| R23 = −105.567 | D23 = 3.80 | N13 = 1.61720 | ν13 = 54.0 |
| R24 = −37.048 | D24 = 0.20 | | |
| R25 = 112.024 | D25 = 3.50 | N14 = 1.60311 | ν14 = 60.7 |
| R26 = −96.575 | D26 = 0.20 | | |
| R27 = 46.294 | D27 = 6.50 | n15 = 1.49700 | ν15 = 81.6 |
| R28 = −34.570 | D28 = 1.80 | N16 = 1.83400 | ν16 = 37.2 |
| R29 = 282.399 | D29 = Variable | | |
| R30 = 145.053 | D30 = 3.20 | N17 = 1.69895 | ν17 = 30.1 |
| R31 = −81.176 | D31 = 1.50 | | |
| R32 = 53.655 | | N18 = 1.80400 | ν18 = 46.6 |

| Variable | Focal Length | | |
|---|---|---|---|
| Separation | 36.00 | 135.65 | 341.89 |
| D5 | 1.77 | 49.04 | 72.21 |
| D13 | 36.88 | 14.79 | 3.43 |
| D19 | 3.32 | 15.04 | 21.52 |
| D22 | 20.02 | 8.29 | 1.82 |
| D29 | 13.19 | 17.72 | 2.01 |

NUMERICAL EXAMPLE 10

(FIGS. 11, 21(A), 21(B) and 21(C))

| F = 36 - 341.6 | FNO = 1:3.4 - 5.7 | 2ω = 62° - 7.2° | |
|---|---|---|---|
| R1 = 151.044 | D1 = 3.00 | N1 = 1.83400 | ν1 = 37.2 |
| R2 = 76.268 | D2 = 0.90 | N2 = 1.49700 | ν2 = 81.6 |
| R3 = 76.460 | D3 = 9.00 | | |
| R4 = −473.959 | D4 = 0.20 | N3 = 1.49700 | ν3 = 81.6 |
| R5 = 73.349 | D5 = 6.80 | | |
| R6 = 611.904 | D6 = Variable | N4 = 1.83481 | ν4 = 42.7 |
| R7 = 1637.251 | D7 = 1.90 | | |
| R8 = 30.503 | D8 = 6.40 | N5 = 1.80400 | ν5 = 46.6 |
| R9 = −83.258 | D9 = 1.50 | | |
| R10 = 83.835 | D10 = 1.00 | N6 = 1.84666 | ν6 = 23.9 |
| R11 = 50.059 | D11 = 5.50 | | |
| R12 = −50.420 | D12 = 0.40 | N7 = 1.80400 | ν7 = 46.6 |
| R13 = −48.545 | D13 = 1.50 | | |
| R14 = 76.570 | D14 = Variable | | |
| R15 = ∞ Stop | D15 = 1.00 | N8 = 1.60311 | ν8 = 60.7 |
| R16 = 79.390 | D16 = 3.30 | | |
| R17 = −77.548 | D17 = 0.20 | N9 = 1.48749 | ν9 = 70.2 |
| R18 = 33.819 | D18 = 5.20 | N10 = 1.84666 | ν10 = 23.9 |
| R19 = −60.779 | D19 = 1.50 | | |
| R20 = 206.673 | D20 = Variable | N11 = 1.70154 | ν11 = 41.2 |
| R21 = −48.747 | D21 = 1.50 | N12 = 1.84666 | ν12 = 23.9 |
| R22 = 33.439 | D22 = 3.80 | | |
| R23 = 318.340 | D23 = Variable | N13 = 1.57250 | ν13 = 57.8 |
| R24 = −92.850 | D24 = 3.60 | | |
| R25 = −34.735 | D25 = 0.20 | N14 = 1.56384 | ν14 = 60.7 |
| R26 = 134.683 | D26 = 3.50 | | |
| R27 = −85.098 | D27 = 0.20 | N15 = 1.49700 | ν15 = 81.6 |
| R28 = 43.341 | D28 = 7.00 | N16 = 1.83400 | ν16 = 37.2 |
| R29 = −32.777 | D29 = 1.80 | | |
| R30 = 529.326 | D30 = Variable | N17 = 1.72825 | ν17 = 28.5 |
| R31 = 124.350 | D31 = 3.20 | N18 = 1.80400 | ν18 = 46.6 |
| R32 = −98.534 | D32 = 1.50 | | |
| R33 = 46.183 | | | |

| Variable | Focal Length | | |
|---|---|---|---|
| Separation | 36.00 | 135.15 | 341.58 |
| D6 | 2.18 | 48.03 | 72.18 |
| D14 | 36.29 | 14.01 | 3.29 |
| D20 | 3.37 | 15.13 | 20.31 |
| D23 | 18.99 | 7.23 | 2.05 |
| D30 | 12.43 | 18.41 | 2.17 |

| | Numerical Example | | | | | | | | | |
|---|---|---|---|---|---|---|---|---|---|---|
| Condition | 1 | 2 | 3 | 4 | 5 | 6 | 7 | 8 | 9 | 10 |
| $\|f_6\|/f_T$ | 0.239 | 0.244 | 0.233 | 0.246 | 0.270 | 0.248 | 0.193 | 0.252 | 0.259 | 0.243 |
| $\|f_6/f_2\|$ | 3.382 | 3.464 | 3.317 | 3.580 | 3.820 | 3.603 | 2.815 | 3.560 | 3.693 | 3.531 |
| $f_1/f_T$ | 0.361 | 0.360 | 0.363 | 0.360 | 0.362 | 0.361 | 0.379 | 0.361 | 0.362 | 0.360 |
| $\|f_2\|/f_1$ | 0.196 | 0.195 | 0.193 | 0.190 | 0.196 | 0.191 | 0.181 | 0.195 | 0.194 | 0.191 |

-continued

| Condition | Numerical Example | | | | | | | | | |
|---|---|---|---|---|---|---|---|---|---|---|
| | 1 | 2 | 3 | 4 | 5 | 6 | 7 | 8 | 9 | 10 |
| $f_5/f_T$ | 0.124 | 0.128 | 0.125 | 0.128 | 0.129 | 0.129 | 0.110 | 0.128 | 0.130 | 0.129 |
| $f_3/|f_2|$ | 2.033 | 2.012 | 2.083 | 2.062 | 2.003 | 2.064 | 2.223 | 2.003 | 2.085 | 2.057 |
| $(D_{1T}-D_{1W})/f_T$ | 0.205 | 0.205 | 0.205 | 0.204 | 0.206 | 0.205 | 0.219 | 0.205 | 0.206 | 0.205 |
| $(D_{2W}-D_{2T})/f_T$ | 0.099 | 0.096 | 0.098 | 0.096 | 0.099 | 0.096 | 0.104 | 0.099 | 0.098 | 0.097 |
| $|f_6|/D_{6W}$ | 1.925 | 1.863 | 1.702 | 1.764 | 2.254 | 1.837 | 1.177 | 2.110 | 1.905 | 1.815 |
| $D_{6T}/|f_6|$ | 1.084 | 1.077 | 1.141 | 1.080 | 0.952 | 1.058 | 1.442 | 1.025 | 1.028 | 1.072 |

As has been described above, according to the present invention, a zoom lens, though being compact, of high ratio of magnification variation can be provided.

What is claimed is:

1. A high variable magnification range zoom lens comprising, in the order from the object side, a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a negative refractive power, wherein letting air separations between the i-th lens unit and the (i+1)st lens unit in a wide-angle end and a telephoto end be denoted by $D_{iW}$ and $D_{iT}$, respectively, zooming from the wide-angle end to the telephoto end is performed by satisfying the following conditions:

$$D_{1W} < D_{1T}$$

$$D_{2W} > D_{2T}$$

$$D_{3W} < D_{3T}$$

$$D_{4W} > D_{4T}$$

2. A high variable magnification range zoom lens according to claim 1, satisfying the following condition:

$$0.1 < |f_6|/f_T < 0.51$$

where $f_6$ is the focal length of said sixth lens unit and $f_T$ is the focal length of said zoom lens in the telephoto end.

3. A high variable magnification range zoom lens according to claim 1, satisfying the following condition:

$$1.5 < |f_6/f_2| < 6.0$$

where $f_2$ and $f_6$ are the focal lengths of said second lens unit and said sixth lens unit, respectively.

4. A high variable magnification range zoom lens according to claim 1, satisfying the following condition:

$$0.26 < f_1/f_T < 0.88$$

where $f_1$ and $f_T$ are the focal lengths of said first lens unit and said zoom lens in the telephoto end, respectively.

5. A high variable magnification range zoom lens according to claim 1, satisfying the following condition:

$$0.11 < |f_2|/f_1 < 0.31$$

where $f_1$ and $f_2$ are the focal lengths of said first lens unit and second lens unit, respectively.

6. A high variable magnification range zoom lens according to claim 1, satisfying the following condition:

$$0.08 < f_5/f_T < 0.3$$

where $f_5$ and $f_T$ are the focal lengths of said fifth lens unit and said zoom lens in the telephoto end, respectively.

7. A high variable magnification range zoom lens according to claim 1, satisfying the following condition:

$$1.1 < f_3/|f_2| < 3.7$$

where $f_2$ and $f_3$ are the focal lengths of said second lens unit and said third lens unit, respectively.

8. A high variable magnification range zoom lens according to claim 1, satisfying the following condition:

$$0.15 < (D_{1T}-D_{1W})/f_T < 0.3$$

where $f_T$ is the focal length of said zoom lens in the telephoto end.

9. A high variable magnification range zoom lens according to claim 1, satisfying the following condition:

$$0.07 < (D_{2W}-D_{2T})/f_T < 0.2$$

where $f_T$ is the focal length of said zoom lens in the telephoto end.

10. A high variable magnification range zoom lens according to claim 1, wherein focusing is performed by moving said sixth lens unit along an optical axis.

11. A high variable magnification range zoom lens according to claim 1, further satisfying the following condition:

$$D_{5W} > D_{5T}$$

12. A high variable magnification range zoom lens according to claim 1, wherein said sixth lens unit is positioned nearer to the object side in the telephoto end than in the wide-angle end.

13. A zoom lens comprising, in the order from the object side,
    a first lens unit of positive refractive power,
    a second lens unit of negative refractive power,
    a third lens unit of positive refractive power,
    a fourth lens unit of negative refractive power,
    a fifth lens unit of positive refractive power, and
    a sixth lens unit of negative refractive power, wherein magnification variation from a wide-angle end to a telephoto end is performed by moving at least said first lens unit and said sixth lens unit toward the object side.

14. A zoom lens according to claim 13, wherein letting air separations between the i-th lens unit and the (i+1)st lens unit in the wide-angle end and the telephoto end be denoted by $D_{iW}$ and $D_{iT}$, respectively, the following conditions are satisfied:

$$D_{1W} < D_{1T}$$

$$D_{2W} > D_{2T}$$

$D_{3W} < D_{3T}$ $D_{4W} > D_{4T}$

15. A zoom lens according to claim 13, satisfying the following condition:

$$0.1 < |f_6/f_T| < 0.5$$

where $f_6$ is the focal length of said sixth lens unit and $f_T$ is the focal length of said zoom lens in the telephoto end.

16. A zoom lens according to claim 13, satisfying the following condition:

$$1.5 < |f_6/f_2| < 6.0$$

where $f_2$ and $f_6$ are the focal lengths of said second lens unit and said sixth lens unit, respectively.

17. A zoom lens according to claim 13, satisfying the following condition:

$$0.26 < f_1/f_T < 0.88$$

where $f_1$ and $f_T$ are the focal lengths of said first lens unit and said zoom lens in the telephoto end, respectively.

18. A zoom lens according to claim 13, satisfying the following condition:

$$0.11 < |f_2|/f_1 < 0.31$$

where $f_1$ and $f_2$ are the focal lengths of said first lens unit and second lens unit, respectively.

19. A zoom lens according to claim 13, satisfying the following condition:

$$0.08 < f_5/f_T < 0.3$$

where $f_5$ and $f_T$ are the focal lengths of said fifth lens unit and said zoom lens in the telephoto end, respectively.

20. A zoom lens according to claim 13, satisfying the following condition:

$$1.1 < f_3/|f_2| < 3.7$$

where $f_2$ and $f_3$ are the focal lengths of said second lens unit and said third lens unit, respectively.

21. A zoom lens according to claim 13, satisfying the following condition:

$$0.15 < (D_{1T} - D_{1W})/f_T < 0.3$$

where $f_T$ is the focal length of said zoom lens in the telephoto end.

22. A zoom lens according to claim 13, satisfying the following condition:

$$0.07 < (D_{2W} - D_{2T})/f_T < 0.2$$

where $f_T$ is the focal length of said zoom lens in the telephoto end.

23. A zoom lens according to claim 13, wherein focusing is performed by moving said sixth lens unit along an optical axis.

24. A zoom lens according to claim 13, further satisfying the following condition:

$D_{5W} > D_{5T}$

* * * * *

UNITED STATES PATENT AND TRADEMARK OFFICE
CERTIFICATE OF CORRECTION

PATENT NO. : 5,189,557

DATED : February 23, 1993

INVENTOR(S) : HIROSHI ENDO

It is certified that error appears in the above-identified patent and that said Letters Patent is hereby corrected as shown below:

Column 2:
    Line 51, "of" (second occurrence) should be deleted.

Column 3:
    Line 9, "IV" should read --VI--.
    Line 28, "$D_5W > D_5T$" should read --$D_{5W} > D_{5T}$--.

Column 4:
    Line 32, "passes" should read --pass--.
    Line 46, "$0.1 < |f_6/|f_T\ 0.5\ (1)$" should read
-- $0.1 < |f_6|/f_T < 0.5 \quad (1)$ --.

Column 21:
    Line 38, "$0.1 < |f_6|/f_T < 0.51$" should read
--$0.1 < |f_6|/f_T < 0.5$--.
    Line 53, "$0.26 < f_1/f_T\ 0.88$" should read
--$0.26 < f_1/f_T \leq 0.88$--.

Column 24:
    Line 9, "$1.1 < f_3/|f_2 < 3.7$" should read
--$1.1 < f_3/|f_2| < 3.7$--.

Signed and Sealed this

Twenty-second Day of March, 1994

Attest:

BRUCE LEHMAN

Attesting Officer        Commissioner of Patents and Trademarks